(12) United States Patent
Sekikawa

(10) Patent No.: US 6,498,658 B1
(45) Date of Patent: Dec. 24, 2002

(54) DIGITAL COPYING APPARATUS

(75) Inventor: Katsuo Sekikawa, Kanagawa-Ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/174,020

(22) Filed: Oct. 16, 1998

(30) Foreign Application Priority Data

Oct. 24, 1997 (JP) .............................. 9-309571

(51) Int. Cl.⁷ .............................. G06F 15/00
(52) U.S. Cl. ...................... 358/1.16; 358/1.1; 358/1.17; 358/401; 358/404; 358/501
(58) Field of Search ............................... 358/1.16, 1.17, 358/1.1, 401, 404, 442, 444, 468, 501, 403; 713/202

(56) References Cited

U.S. PATENT DOCUMENTS 5,706,457 A * 1/1998 Dwyer et al. ............... 345/835
6,111,659 A * 8/2000 Murata ........................ 358/296

FOREIGN PATENT DOCUMENTS

| JP | 01-189277 A | 7/1989 |
| JP | 06-040092 | 2/1994 |
| JP | 06-284235 | 10/1994 |
| JP | 06-284254 | 10/1994 |

* cited by examiner

*Primary Examiner*—Mark Wallerson
*Assistant Examiner*—Twyler Lamb

(57) ABSTRACT

An image read part reads documents and stores the image data thereof in a memory card. Reduced image creating device creates reduced image data according to stored image data. The reduced images are displayed as an icon on display of an operation panel by using the reduced image data. One of the icons displayed on the display is selected a using pointing device, the image data corresponding to the selected icon is read from the memory card and an image is printed out.

15 Claims, 25 Drawing Sheets

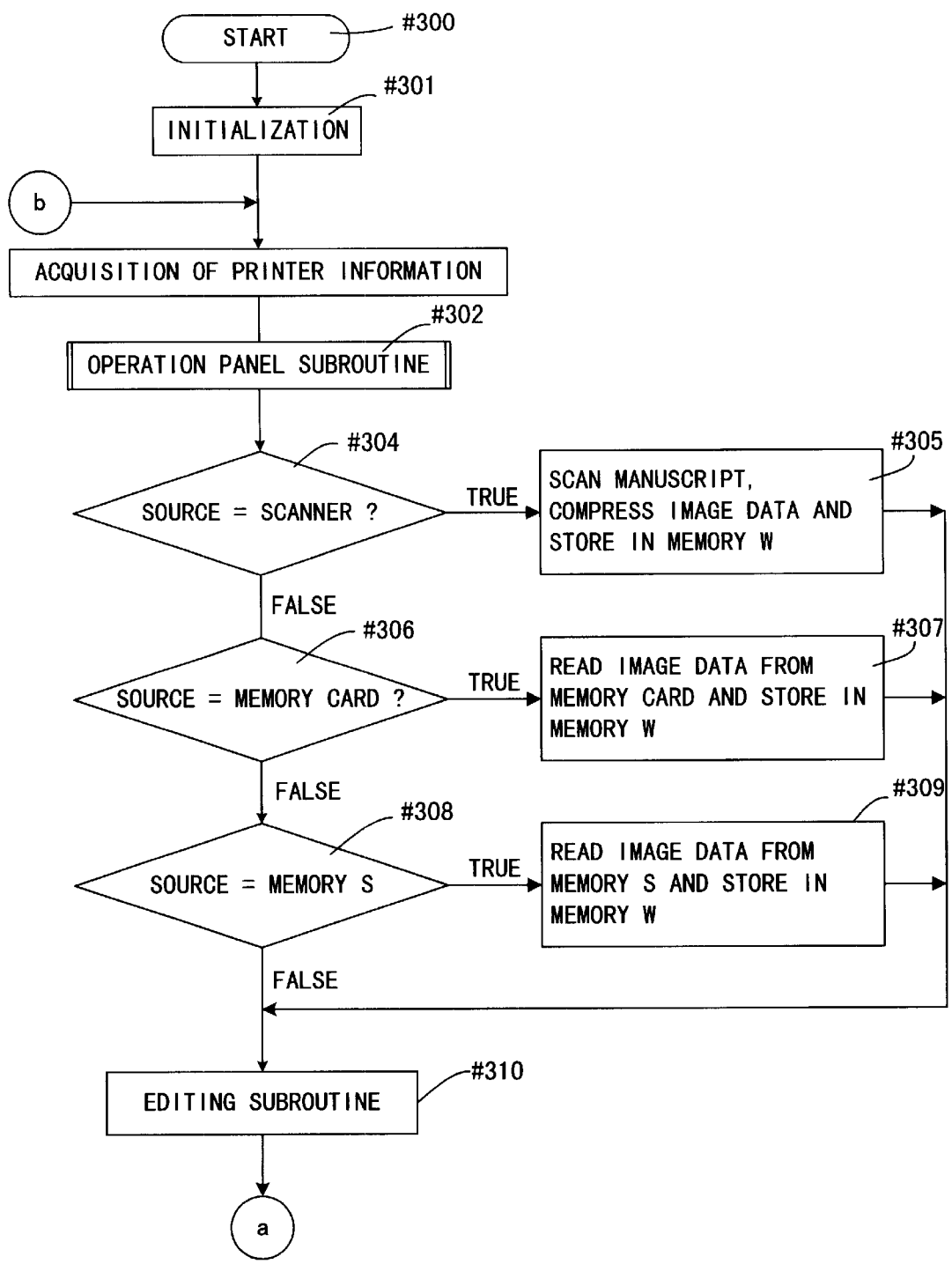

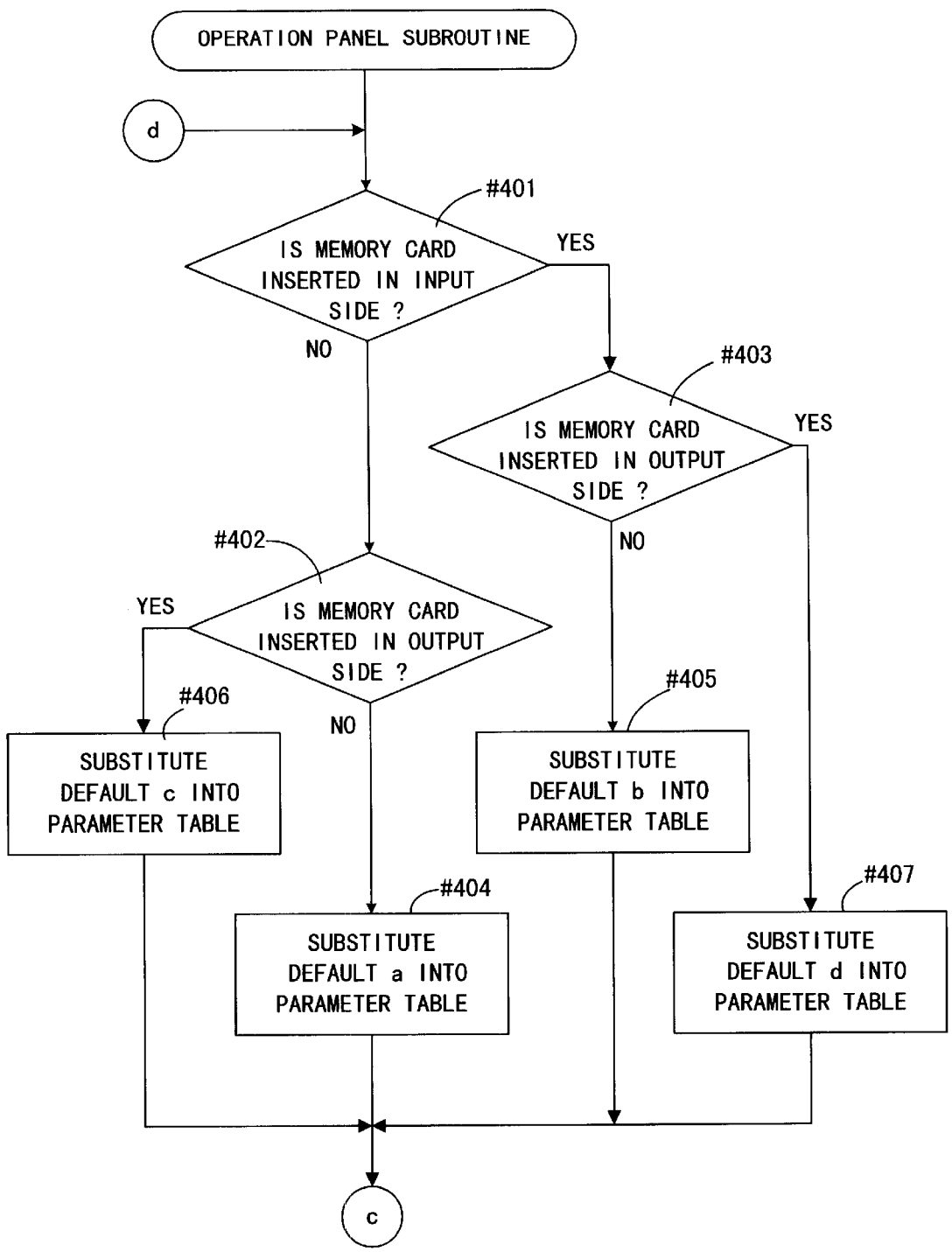

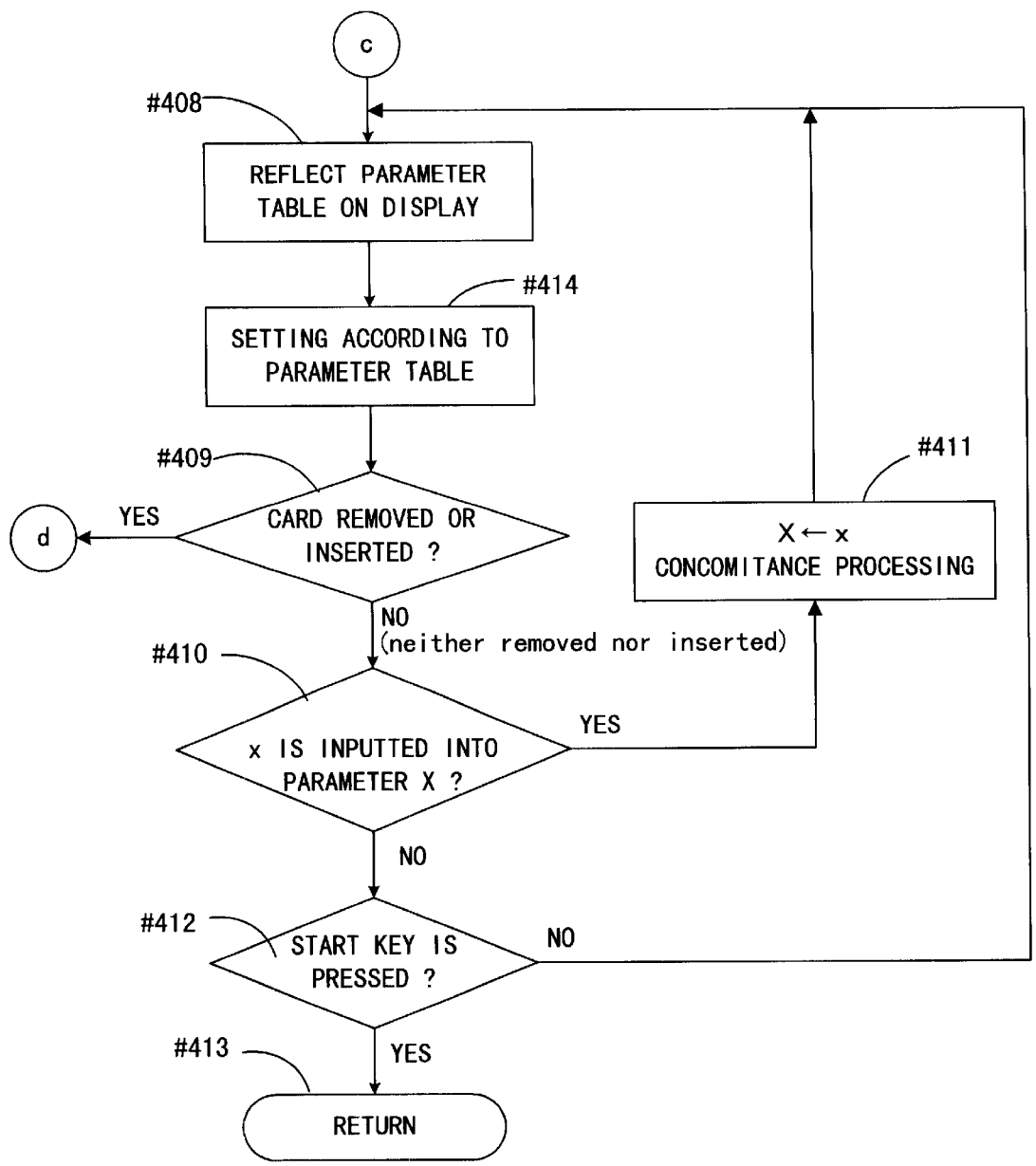

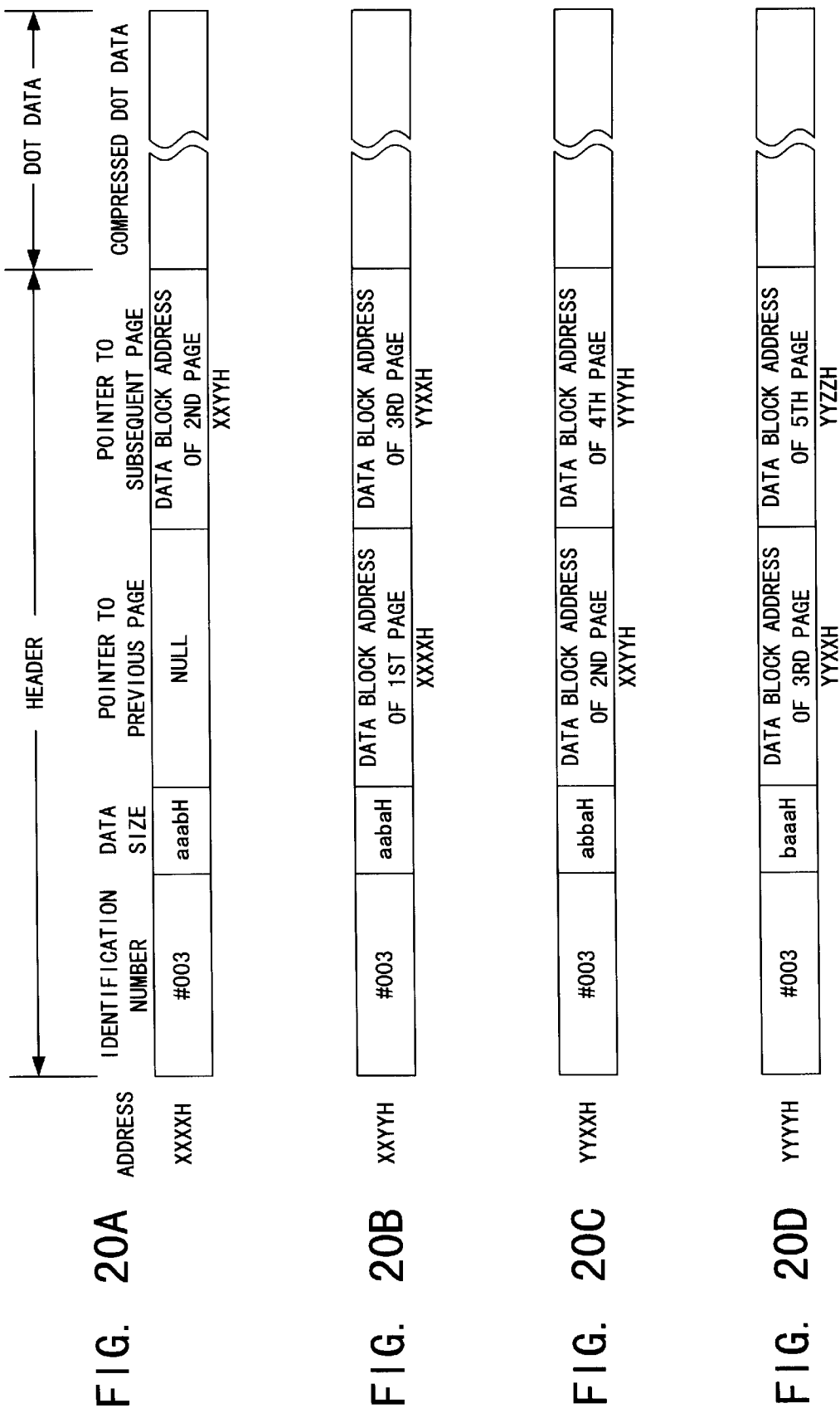

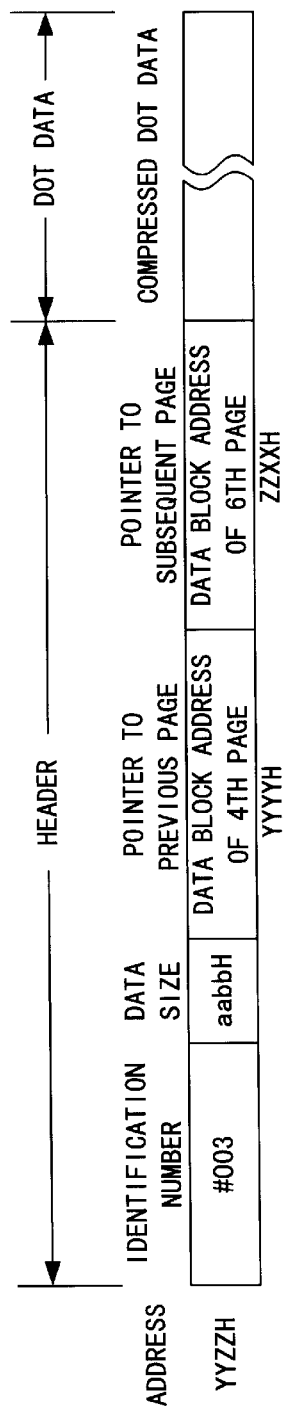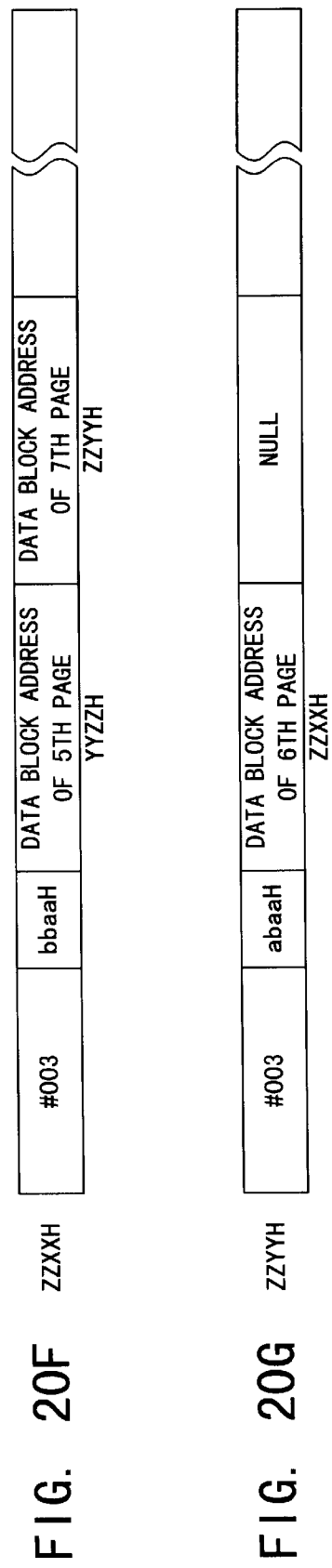
FIG. 20E
FIG. 20F
FIG. 20G

DIGITAL COPYING APPARATUS

This application is based on application No. H9-309571 filed in JAPAN, the content of which is hereby incorporated by reference.

BACKGROUND OF THE INVENTION

1. Field of the Invention

The present invention relates to a digital copying apparatus, an image input/output apparatus and a printing apparatus and further relates to those which are provided with both fixed storage device and removable storage medium.

2. Description of the Prior Art

A Digital copying apparatus is usually provided with fixed storage device. When copying is executed, the original document put on the contact glass is scanned by scanner of the copying apparatus to get the image data, the image data is stored in the fixed storage device (e.g. memory or hard disk) and printed out on a paper by printing device thereof.

When the additional copies of the original document or reprinting are required after the original document is copied, the operator can print out the copies without the original document by using the image data stored in the fixed storage device of the digital copying apparatus.

In such a digital copying apparatus, it is extremely difficult for the operator to select the objective image data out of many files in the storage device, because each of the image data is only numbered or has only simplified name and is displayed by the number or the simplified name on operation panel thereof.

Furthermore, in the digital copying apparatus of prior art, there is a danger or probability of being watched or stolen the secret image data, because the data is left in the fixed storage device thereof.

Furthermore, in the digital copying machine of prior art, there is a danger or probability that the important image data is erased from the fixed storage device to store new image data therein.

There is a copying apparatus which reduces a part of the first problem.

Prior to the regular printing operation using the image data stored in the copying apparatus, the machine prints out a paper, named "Form", on which reduced size images and check boxes are printed.

An operator checks the check boxes of the "Form" for selecting image data to be printed out.

The checked "Form" sheets are read by the copying apparatus. Then information of printing image data is recognized by the printing apparatus and regular printing operation are started.

The printing apparatus requires the operator to mark check box and to feed "Form" thereto.

Further, the operator can not specify a necessary page which is to be outputted.

SUMMERY OF THE INVENTION

It is an object of the present invention to provide a digital copying apparatus, an image input/output apparatus and a printing apparatus, wherein the operator can easily select the objective image data out of many files in storage device by pointing one of the small images which are made from the stored image data and displayed on operation panel thereof.

It is another object of the present invention to provide a digital copying apparatus, an image input/output apparatus and a printing apparatus, wherein a memory card and image data stored therein the secret image data are put under the control of the user and therefore, the secret data is protected form being watched, stolen or erased by others.

Other objects and features of present invention will become apparent from the following description taken in connection with accompanying drawings.

BRIEF DESCRIPTION OF THE DRAWINGS

FIG. 3A and FIG. 3B show a flowchart illustrating an outline of operations in the first embodiment.

FIG. 4A and FIG. 4B show a flowchart of "operation panel subroutine" shown in FIG. 3A.

FIG. 20A to FIG. 20G are diagrams showing details of headers which are attached to compressed image data when being stored separately, page by page.

DETAILED DESCRIPTION OF THE PREFERRED EMBODIMENTS

Hereafter, embodiments according to the present invention are described with reference to the drawings.

The First Embodiment
[The Outline of the Configuration of the Digital Copier]

Figure 1:
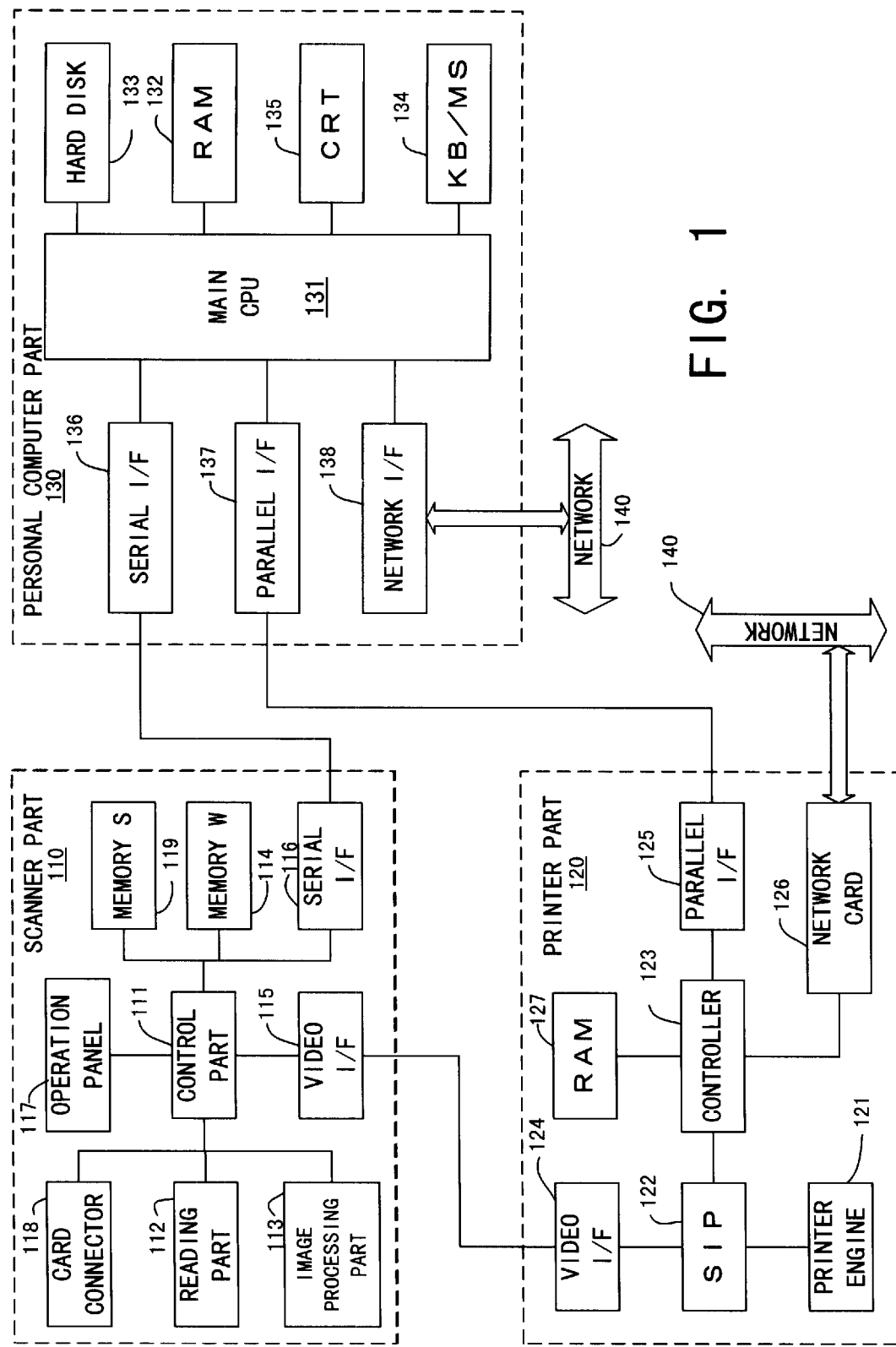
FIG. 1 shows a block diagram of a digital copier according to a first embodiment of the present invention capable of storing image data and an example of a configuration of a personal computer connected therewith.

FIG. 1 is a block diagram showing a digital copier according to the present invention which can store image data and a configuration of a personal computer connected with the digital copier.

Since this digital copier capable of storing image data roughly comprises the scanner part 110 and the printer part 120, the digital copier has a function of scanner and a function of printer. Moreover, since the digital copier includes the serial interface and the card connector, the digital copier can perform a variety functions: a function of storing previously-processed image data and printing out the image utilizing these image data, a function of sending the stored image data to the personal computer etc. by serial, a function of receiving image data from the personal computer by serial, storing these, and printing these image out, a function of writing image data in the memory card, a function of reading image data from the memory card, etc.

Accordingly, if one pays attention to the scanner part, the digital copier can be regarded as an image reading device, and if one pays attention to the printer part, the digital copier can be regarded as a printer.

In addition, since the digital copier can store image data, the digital copier can be considered as an image data input/output device.

The scanner part 110 is provided with: a control part 111, an image reading part 112, an image processing part 113, a memory W 114, a memory S 119, a video interface 115, a serial interface 116, an operation panel 117, and the card connector 118 in which the memory card is inserted, all of these members being connected to the control part 111.

The control part 111 performs the control of the scanner part 110 in whole, the control of input/output of status information between the printer part 120 and the personal computer 130, the control of the writing in the memory card through the card connector 118, the control of the compression/expansion processing of image data, the control of the thinning processing of image data, the control of icon creation, the control of the binarization of image data, etc.

The image reading part 112 emits light on a manuscript, is equipped with a sensor (CCD sensor) for reading its reflected light, and carries out A/D conversion.

The image processing part 113 performs the discrimination between character and photograph regions, edge enhancement, smoothing processing, error diffusion, etc.

The memory W 114 is a readable/writable RAM and has a memory area for a control program of the digital copier of the present embodiment, a working area for controlling, a various tables for controlling, a memory area for processing image data being read with the image reading part 112, etc. A part of the memory 114 where the above-mentioned control program and various default values etc., whose information is not necessary to rewrite are arranged can be configured with a ROM.

The memory S 119 is a readable/writable RAM for storing image data, wherein the digital copier enables re-printing using the stored image data in the memory S 119.

Moreover, a function of storing image data can be performed not with a RAM but with an external storage device such as a hard-disk drive and the likes as a substitution of a RAM.

The video interface 115 is a dedicated interface for image output to the connected printer part 120 and for control signals.

A cable connecting the scanner part 110 and the printer part 120 functions as a transmission path for control signals and image data.

The serial interface 116 is a standard interface for connecting the personal computer part 130 and a peripheral device, which connects the serial interfaces 116 and 136 of the personal computer part 130 and the scanner part 110, respectively, with each other with a cable.

The operation panel 117 is provided with a display part for displaying statuses of the scanner part 110 and the printer part 120, keys for inputting setting values of various conditions of the digital copier, etc.

The card connector 118 is a connector in which the memory card is inserted.

Although not shown in the drawings, the card connector 118 is provided with both a card connector for input and a card connector for output.

The memory card is a medium which is used for transferring data when the user reuses image data obtained by the digital copier in other digital copier and personal computer, etc. or when the user uses image data obtained with other digital copier and personal computer, etc. in this digital copier.

The printer part 120 is provided with a printer engine part 121, a switching part (SIP) 122, a printer controller 123, a video interface 124, a parallel interface 125, a network card 126, and a RAM 127.

The printer engine part 121 prints image data from the scanner part 110 or the personal computer part 130.

The switching part (SIP) 122 switches the scanner part 110 and the personal computer part 130 so that image data from the former or the latter is printed.

The printer controller 123 controls the printer part 120 in whole. A print command from the scanner part 110 is sent to the printer controller 123 through the video interface 124 and the switching part (SIP) 122.

The printer controller 123 receives the print command from the scanner part 110, and performs the answering to the scanner part 110 and the control of the printer engine 121.

And the printer controller 123 converts image data sent from the personal computer part 130 to dot data.

The video interface 124 is a dedicated image interface for the present printer.

The parallel interface 125 is a standard interface for connecting the personal computer and a peripheral device and a cable connecting the printer part 120 and the personal computer part 130 functions as a transmission path for image data.

The network card 126 receives a print command from a personal computer connected to the network 140 and processes it.

The RAM 127 temporarily stores image data which are sent from the personal computer to the controller 123 and is used as a working area for the conversion of the image data to dot data.

The personal computer part 130 is provided with a main CPU 131, a RAM 132, a hard disk drive 133, a keyboard/mouse 134, the serial interface 136, a parallel interface 137, a network interface 138, etc.

The main CPU 131 reads an application software for setting a function of the scanner part 110, a scanner driver for issuing a command to the scanner part 110, and a printer driver for issuing a command to the printer part 120 from the hard disk drive 133 and executes these on the RAM 132.

The application software features a scanner-mode setting function, a print command function, a scan command function, a copy command function, an edit command function, a display command function, etc. The application software issues an operation command to the scanner part 120 through the scanner driver.

The application software issues an operation command to the printer through the printer driver.

Further, the serial interfaces 116 and 136 for connecting the scanner part 110 and the personal computer part 130 can be a SCSI interface etc.

And, the network interface 138 communicates with other apparatuses connected to the network 140 by connecting the personal computer part 130 to the network 140.

[Operation Panel]

Figure 2:
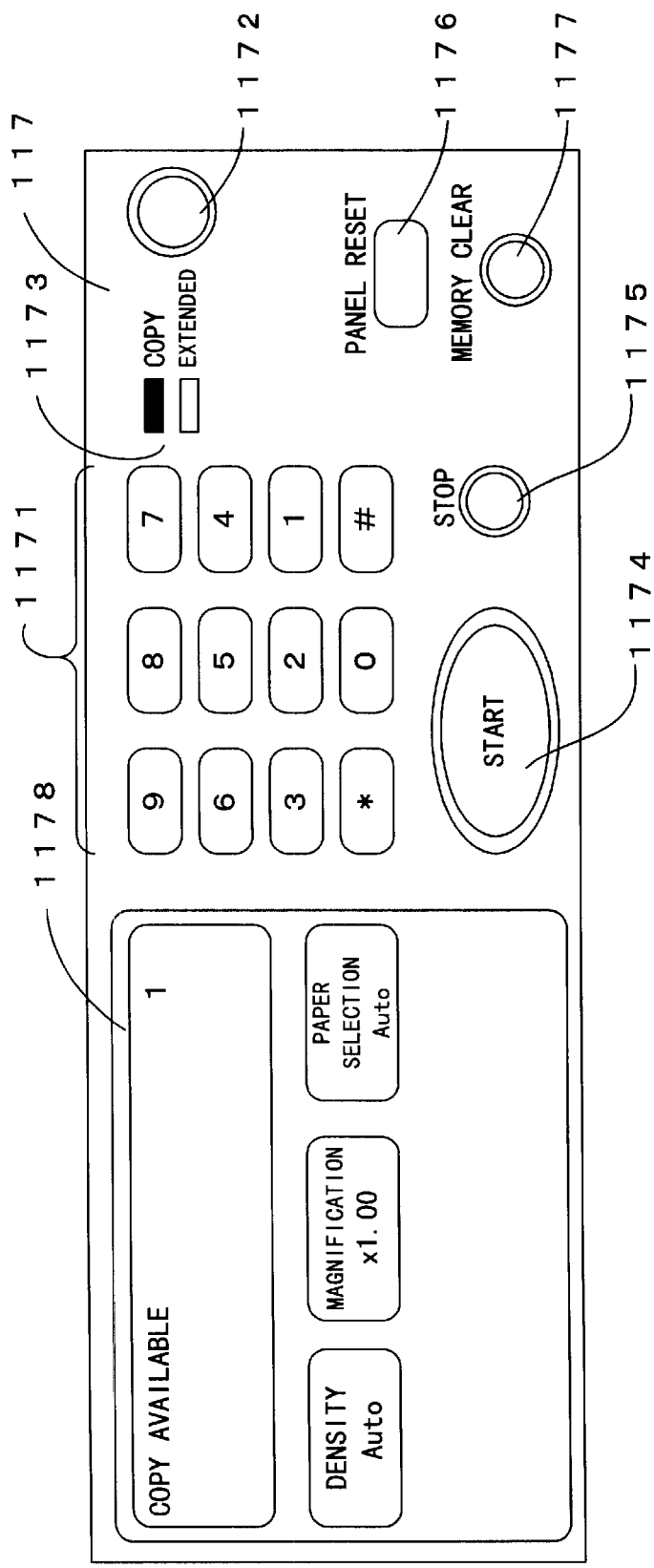
FIG. 2 shows a front view of the operation panel of the digital copier in the first embodiment.

FIG. 2 shows a front view of the operation panel of the digital copier in the first embodiment.

The operation panel 117 is provided with: a ten-keys 1172, a switching key for switching from one mode wherein functions as a copier are used to the other mode wherein functions other than a copier are used and vice versa, a start key 1174 for commanding the start of operations and a stop key 1175 for commanding the stop of operations, a panel reset key 1176 for putting a setting of the operation panel 117 to default values, a memory clear key 1177 for deleting image data stored in the memory inside the scanner, and the LCD 1178 with a fitted touch panel for performing a display of various settings and various states.

[Main flowchart]

Figure 3B:
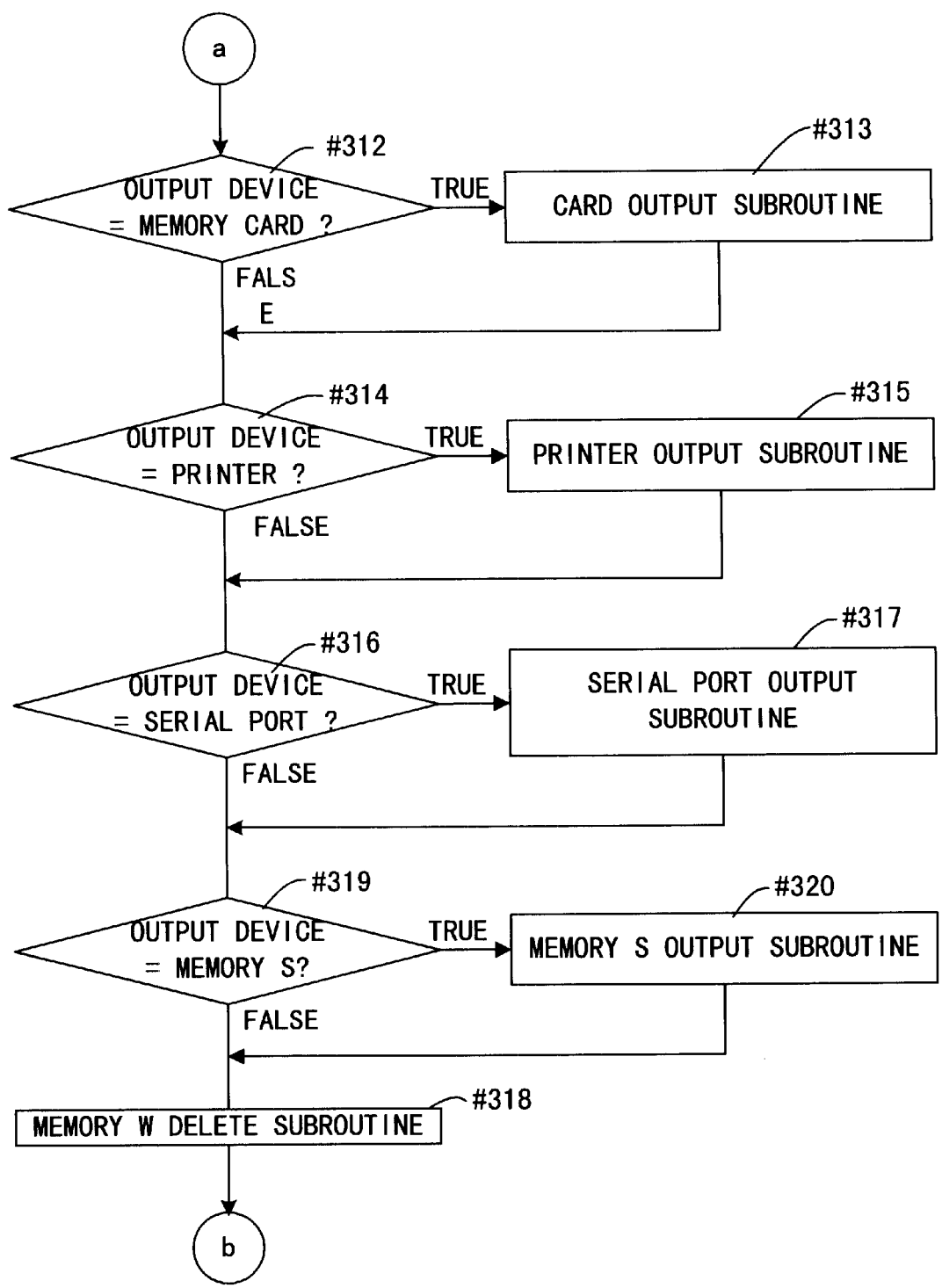

FIG. 3 is a flowchart of a main routine illustrating an outline of the operations of the scanner part 110 and the control part 111 in the present embodiment.

If a power supply is turned on or the scanner part 110 is reset, this main routine gets started (#300), and an initial processing of various factors of the scanner part 110 is performed immediately (#301).

If the initial processing is completed, the control part 111 acquires printer information and enters operation panel subroutine #302.

In this subroutine, an initial screen is displayed on the operation panel 117 and a LED at "COPY" side of mode-indicating LED's is turned on (default is set as "COPY").

Figure 5:
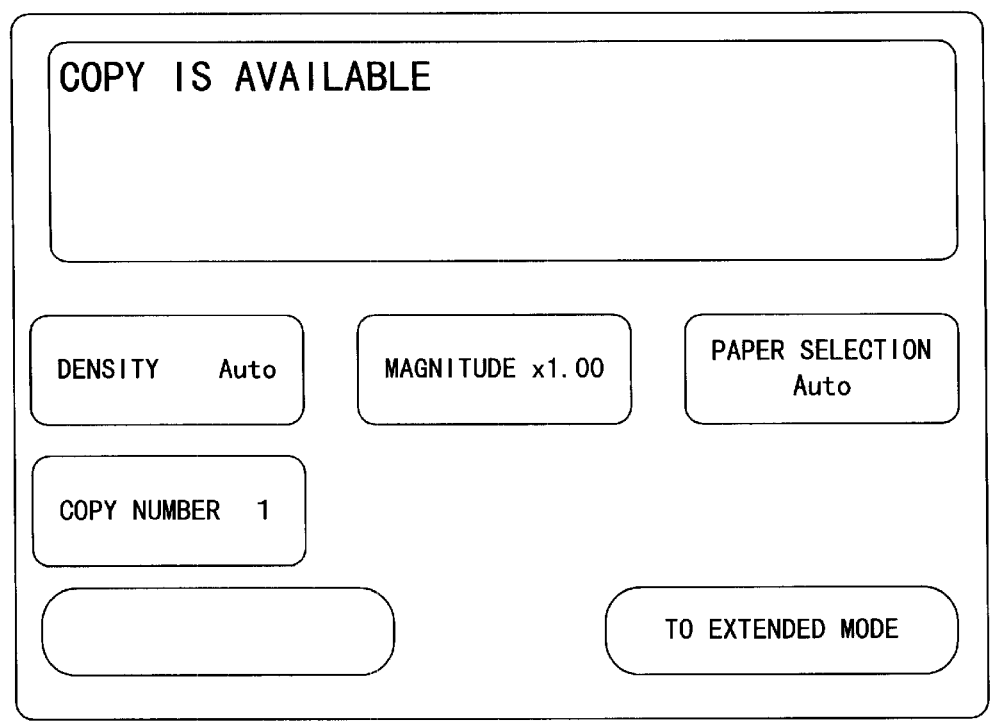
FIG. 5 shows an example of the first screen image on LCD of the operation panel displayed when memory card is not inserted.

This initial screen, as shown in FIG. 5, is for a mode wherein the digital copier of the present embodiment is used as a copier, namely the intrinsic function thereof, and the most normally used condition is set, that is: COPY NUMBER being one sheet, COPY DENSITY automatic adjustment, COPY MAGNIFICATION unity, and PAPER automatic selection.

The operation panel subroutine #302 is a subroutine for setting parameters which determine various operations of this digital copier and the user can alter each of the various parameters by pressing a key of the operation panel 117 or touching or fingering a specified position of the touch panel 1178. Content of each parameter is displayed at a specified position of a specified image of the display part.

A parameter table is conceptually a bunch of parameters so arranged as in a table form and when the digital copier of the present embodiment operates, each operation is executed by referring a necessary position in this parameter table. p14

This operation panel subroutine #302 can be repeatedly performed until the user presses the start key 1174.

In the present digital copier, source of image data can be selected from among the scanner, memory card, fixed storage device, etc. the user can select sources (origins) of image data.

That is to say, the user can select among various ways of obtaining image data: a way of acquiring image data using the scanner; a way of acquiring image data from the memory card; a way of using image data stored in the fixed storage device; etc.

The above-mentioned selection is performed by the operation panel subroutine #302, namely, a content of a parameter specifying an read source which is set by this operation panel subroutine #302 is checked by the step #304, the step #306, or #308 and the flow is branched according to the content. At a branched site, one of processing #305, #307, and #309 is executed and the flow proceeds to the step #310.

If acquisition of image data is set to be performed by the scanner, the step #304 fulfills "TRUE" and the flow proceeds to the step #305, where a document is read or scanned and the data is compressed and stored in the memory W 114.

If acquisition of image data is set to be performed from the memory card, the step #306 fulfills "TRUE" and the flow proceeds to the step #307, where the image data are read from the memory card and stored in the memory W 114.

By the way, the compression of image data is carried out in the present embodiment simply because of a merit that the compression reduces capacity used in the storage device and, in addition, increases the speed of transmission, therefore compression of image data is not essential.

In the step #308, if the acquisition of image data is set to be performed from the memory S 119, the step #308 fulfills "true" and the flow proceeds to the step #309, where image data are read from the memory (s) and stored in the memory W 114.

The step #310 is an editing subroutine for deleting a page and outputting only a specified page and performs processing according to contents specified by the precedent operation panel subroutine #302. The result thus processed is outputted at one of subsequent output routines #313, #315, and #317.

The edit can be carried out to data which are already stored in the memory.

Besides, the deletion is carried out by each page or by each job in the present embodiment; however, processing such as blanking a specified part in a page and the like can be possible if the LCD 1178 with a fitted touch panel is substituted with one having a higher resolution and a software is modified so as to manage such a job.

The step #312, the step #314, the step #316, and the step #319 check output devices of image data. Unlike input sources, a plurality of output devices can be specified simultaneously and outputting is processed sequentially. This difference will be clearly understood by referring the flowchart.

If either of the above-mentioned steps fulfills "true", the flow proceeds to card output subroutine #313, printer output subroutine #315, a serial port output subroutine #317, and/or memory S output subroutine #320.

In the present embodiment, image data which are taken in while using this digital copier are generally preserved in the memory S 119 if nothing particular is performed.

However, there are data whose contents should not be open to general public depending upon the sort of data.

For such a case, the digital copier is configured so as not to preserve such data in memory S 119 by specifying so in the operation panel routine.

The memory W delete subroutine #318 is a subroutine for deleting data left in the memory W.

If the user intentionally does not select "MAINFRAME STORAGE DEVICE" in the bottom of the display item of OUTPUT DEVICES (in the right of the large arrow)of FIG. 6, which is to be described later, the said data are not stored.

Since it is postulated that the memory card is used for such data containing strong confidentiality as the above-mentioned data, it is set that data are not left in the memory S 119 as default when the memory card is mounted.

In the present embodiment, the steps from #302 to #320, which are mentioned above, are repeated.

By the way, since the printer part 120 is configured to be able to be used directly also from the personal computer part 130 by connecting the parallel interface 137 of the personal computer part 130 with the parallel interface 125, it is set that the scanner part 110 and the personal computer part 130 are controlled in an exclusive manner so that data from both parts 110 and 130 should not collide with each other, that is, both parts 110 and 130 can not be used simultaneously.

Accordingly, a routine for using the printer part 120 as a printer for the personal computer etc. is not provided in the above-mentioned main routine.

The operation panel subroutine #302 is for setting several conditions sequentially according to a screen shown on the LCD 1178 with a fitted touch panel.

Contents set in this routine are reflected on the parameter table and operations after the step #304 are carried out by referring this parameter table.

[Flowchart of the Operation Panel Subroutine]

FIG. 4 is a flowchart illustrating an outline of the operation panel routine #302.

If the flow enters this subroutine, the step #401, the step #402, and the step #403 check whether the memory card is inserted in the card connector 118 or not, and if the memory card is inserted, then whether the memory card is inserted in the input side or the output side of the card connector 118, or the memory cards are inserted in both sides of the card connector 118.

According to this check result, default a, b, c, or d is substituted in the parameter table at the step #404, the step #405, the step #406, or the step #407, respectively.

Each of default a, b, c, and d comprises a group of parameters and specifies contents which is first displayed on the LCD 1178 with a fitted touch panel according to a state of the insertion of the memory card.

The default a is a group of parameters for displaying the screen of FIG. 5 and this screen is shown first when the memory card is not inserted at all.

Figure 12:
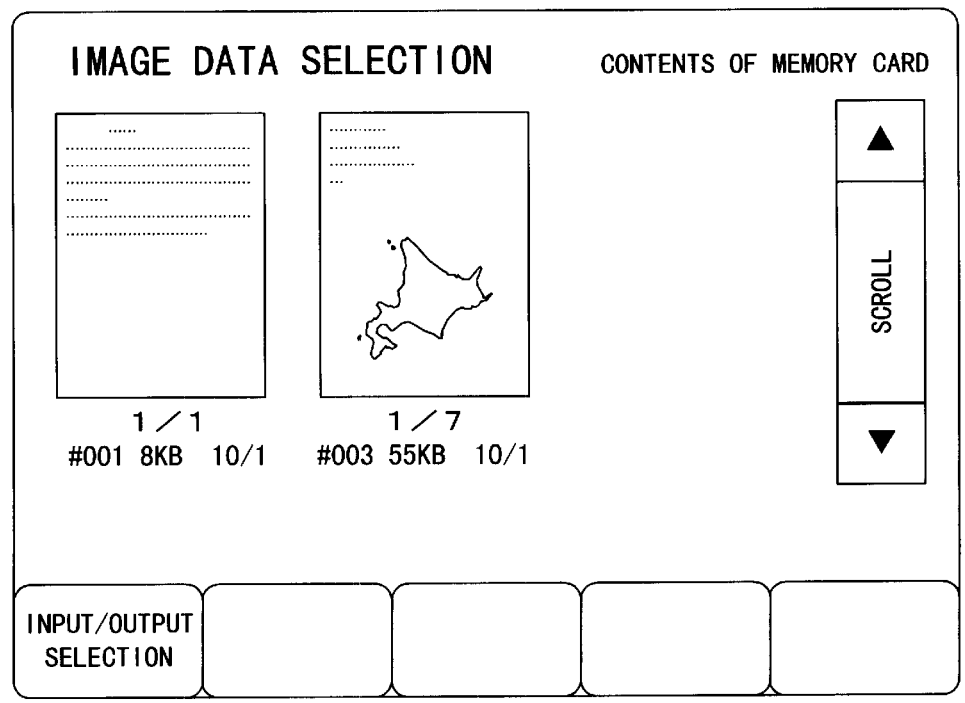
FIG. 12 shows an example of the first screen image on LCD of the operation panel displayed when memory card is inserted in the input side of the connector.

The default b is a group of parameters for displaying the screen of FIG. 12 and this screen is shown first when the memory card is inserted only in the input side of the card connector 118.

Figure 18:
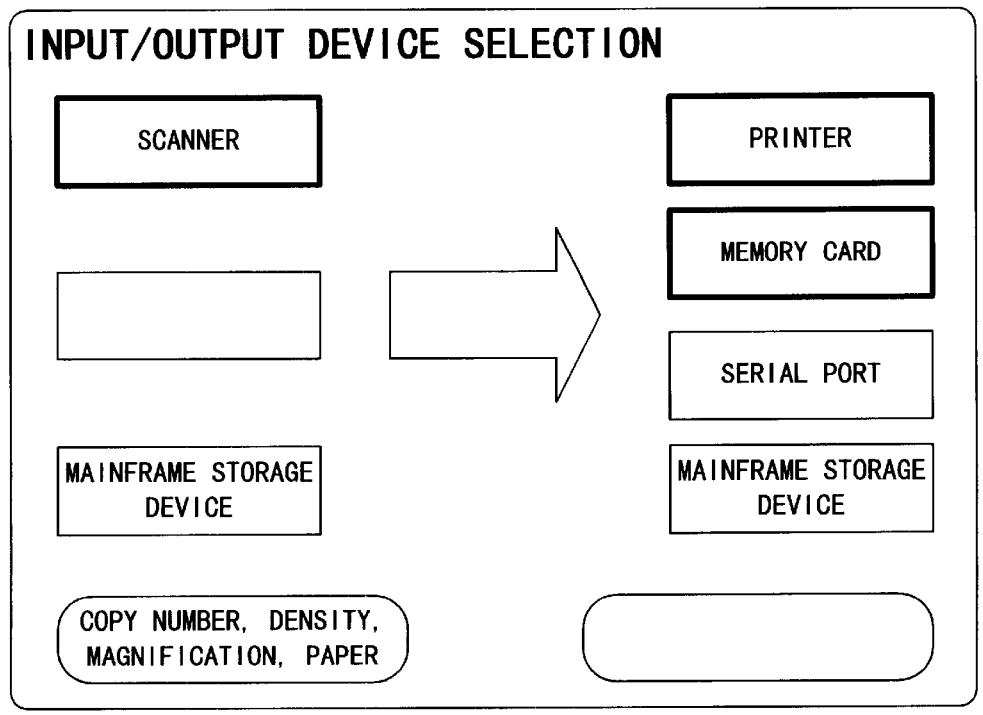
FIG. 18 shows an example of the first screen image on LCD of the operation panel displayed when memory card is inserted in the output side of the connector.

The default c is a group of parameters for displaying the screen of FIG. 18 and this screen is shown first when the memory card is inserted only in the output side of the card connector 118.

Figure 19:
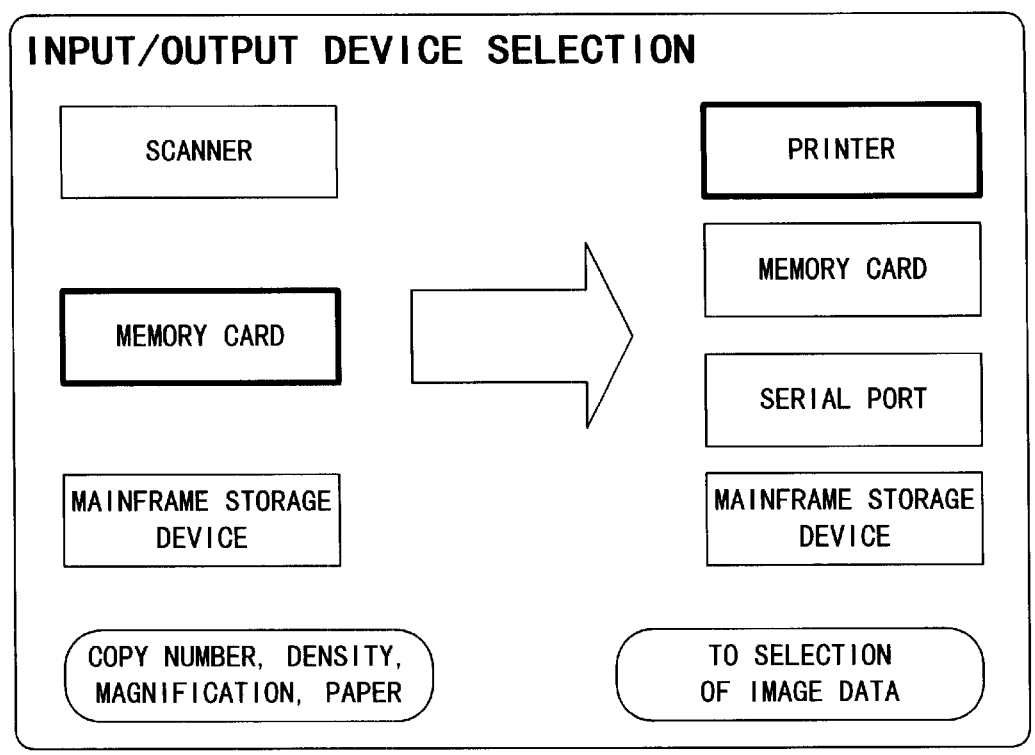
FIG. 19 shows an example of the first screen image on LCD of the operation panel displayed when memory cards are inserted in the input side and in the output side of the connector.

The default d is a group of parameters for displaying the screen of FIG. 19 and this screen is shown first when the memory cards are inserted in the input side and the output side of the card connector 118.

In the step #408, a display according to each case is performed by referring the parameter table in which one of the default a, b, c, and d is substituted.

Figure 24:
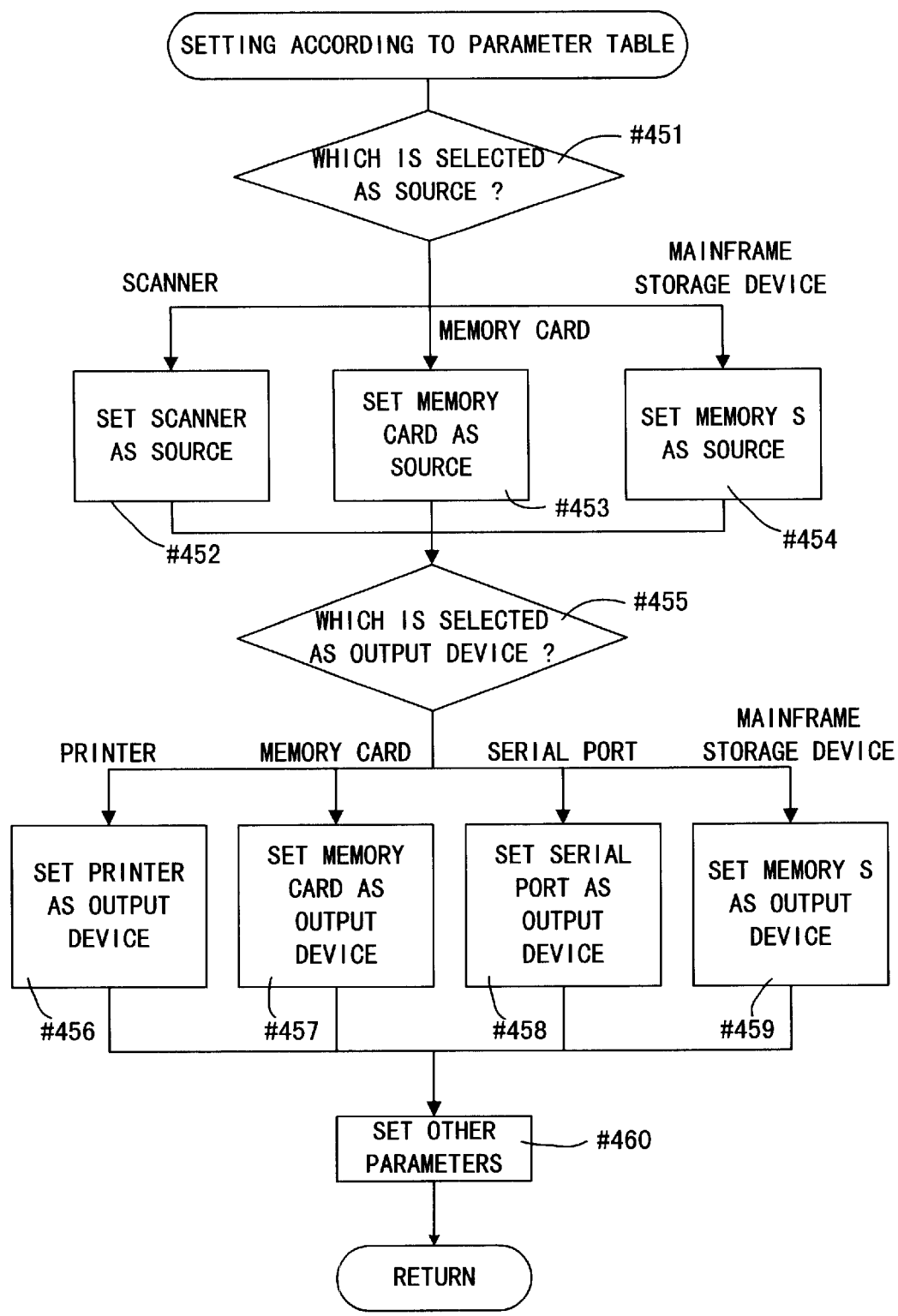
FIG. 24 is a subroutine flowchart "SETTING ACCORDING TO PARAMETER TABLE".

In the step #414, various settings are specified according to values of the parameter table. As for a subroutine of this step #414, its flowchart is shown in FIG. 24 that will be described later.

In the step #409, it is checked whether the memory card is removed or inserted afterward or not, and if so, the flow returns to the initial position of the operation panel subroutine. If not so, the flow proceeds to the next step #410.

In the step #410, it is detected whether an operation that the user inputs a value x into an arbitrary item X in the screen displayed presently is completed or not.

If this input operation is completed, in the step #4111 the flow substitutes a value x for a parameter which corresponds to the item X according to this detection result, and if substitution for a specified item is performed, an concomitant processing is carried out, the flow goes back again to the step #408 and repeats the same operation.

In explaining further, for example, the above-mentioned specified items includes an item standing for "TO SELECTION OF IMAGE DATA", which will be described later, if this item is pressed, "TO SELECTION OF IMAGE DATA" is selected. The above-mentioned concomitant processing includes a job of creating an icon, as mentioned later.

If in the step #410 an input operation is not detected, then whether the start key 1174 is pressed in the step #412 or not is detected, and if the pressing is not detected, the flow goes back to the step #408 and repeats the same operation.

If the pressing of the start key 1174 is detected, the flow leaves this subroutine(#413).

The steps from #408 to #412 are dialog routines between the user and the machine, the digital copier, and since there is a contingency that the user removes the memory card or inserts the memory card during this interval, the step #409 is provided.

By the way, since the capacity of the memory S 119 is limited and the memory S 119 can not store image data infinitely, it is set that old data are being deleted (i.e. new data are overwritten on old data) in sequence, for example deleting the oldest data first.

[Display Screen and Operation]

Although it will be a repeated description partially, hereby a situation of the setting of the conditions carried out in the operation panel routine #302 is explained using an example of a screen displayed actually.

(1) If the memory card is not inserted

If the memory card is not inserted in the card connector when a power supply of the digital copier of the present embodiment is turned on, when a reset button not shown in the diagrams is pressed, when a panel reset key 1176 is pressed, or when a job is completed; the screen as shown in FIG. 5 is displayed on the LCD 1178 with a fitted touch panel.

This schematic of a screen shows the screen of a mode wherein the digital copier is used as a copier. That is to say, this is the screen when a manuscript is copied on a paper, wherein COPY NUMBER is one sheet, DENSITY is automatic adjustment, MAGNIFICATION is unity, and PAPER SELECTION is automatic selection.

In this screen, if the user fingers the part of "COPY 1", the touch panel detects this location, a display of this part is reversed, and the user can input a numeric in this part of "1". If the number of copies is 3 and the user presses the "3" key in the ten-keys 1171, this part change to "3", indicating that the number of copies is 3.

If the user fingers the part where "DENSITY Auto" is encircled with the flame, indices of several steps of the density from "DARK" to "LIGHT" appear, and if the user touches further on a desired index, the density is selected.

The operations for MAGNIFICATION and PAPER SELECTION are the same and description for these will not be given specially.

If the user presses a start key 1174, a normal copying job is executed.

If the user fingers inside the frame, in which the display item of "TO EXTENDED MODE" is shown, in the lower right of the screen of FIG. 5, the user can select a mode wherein various functions, which this digital copier has other than a normal copying function, can be used.

Figure 6:
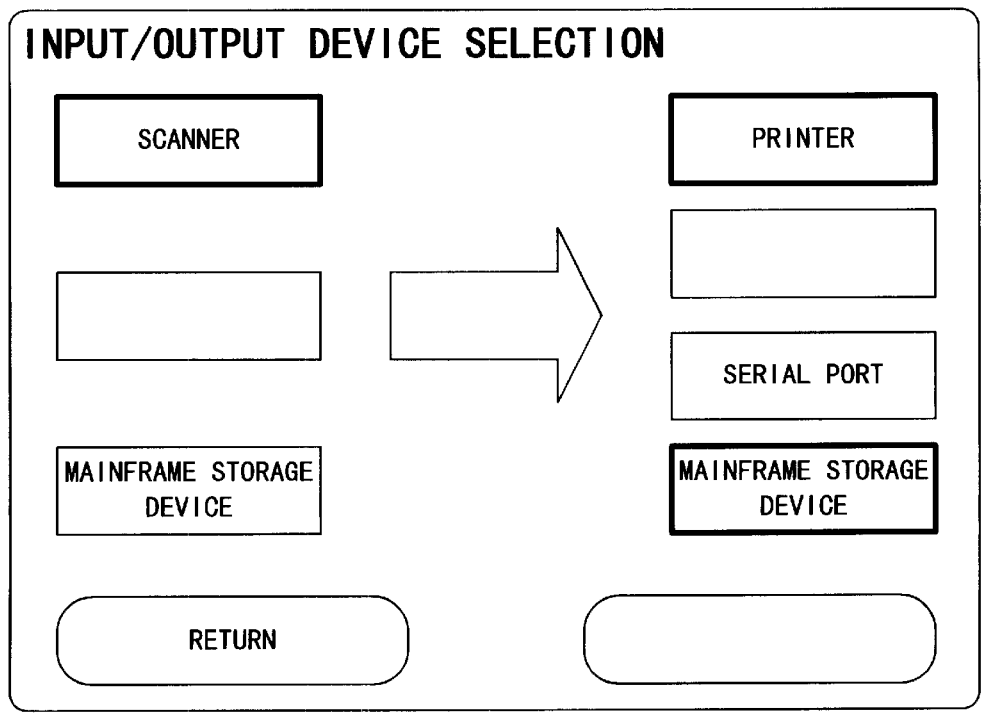
FIG. 6 shows another screen image, "INPUT/OUTPUT DEVICE SELECTION", wherein input device and output device are selected.

FIG. 6 is the display of INPUT/OUTPUT DEVICE SELECTION which is shown if the user fingers "TO EXTENDED MODE" in the state of FIG. 5.

In this screen, the user is expected to select an input device and output devices. Here, since FIG. 5 is the screen for a most ordinary case that the digital copier is used as a copier, a state of INPUT/OUTPUT DEVICE SELECTION is shown specifically for a copier.

In the screen of FIG. 6, the parts in reverse display (the parts encircled with a thick frame) represent selected devices, in the left side of the large arrow input devices are shown and in its right side output devices are shown.

In the screen of INPUT/OUTPUT DEVICE SELECTION of FIG. 6, it is shown that "SCANNER" is selected as the input device and "PRINTER" and "MAINFRAME STORAGE DEVICE" are selected as the output devices.

Here, as the input device only one device can be selected because of its nature, while as the output device a plurality of devices can be selected simultaneously.

When the digital copier of the present embodiment executes a copying job, the image data read by the scanner part 110 are stored in the mainframe storage device (memory S 119) and then printed out on a paper by the printer part 120. Normally, the image data stored in the mainframe storage device are not deleted afterward and remains stored in the mainframe storage device as it is.

Since the digital copier has such specification, in FIG. 6 "PRINTER" and "MAINFRAME STORAGE DEVICE" are displayed in reverse display as the output devices. By the way, in order that the image data should not be left in the mainframe storage device because of circumstances of confidentiality etc., the user only needs to resolve the reverse state of "MAINFRAME STORAGE DEVICE" in such a way as described later.

In a state of the screen of FIG. 6, with the start key 1174 being pressed, a normal copying job can be executed as is the case with a state of FIG. 5.

In the screen of INPUT/OUTPUT SELECTION of FIG. 6, already-selected devices can be changed by fingering the part of display items indicating the input and the output devices.

In the occasion, regarding the input devices, if the user fingers a not-reversed device, a device already reversed until that moment is no longer in a reverse state. Therefore always only one device can be in a reverse state.

On the other hand, regarding the output devices, if the user fingers a reversed device, the device is not in a reverse state, and if the user fingers the device again further, the device gets in a reverse state again. And the device does not change the state so far retained even if other device is get reversed. Therefore a plurality of devices can be selected.

By the way, if the user fingers "RETURN" in the lower left of the screen of FIG. 6, the screen of FIG. 6 goes back to the screen of FIG. 5.

Figure 7:
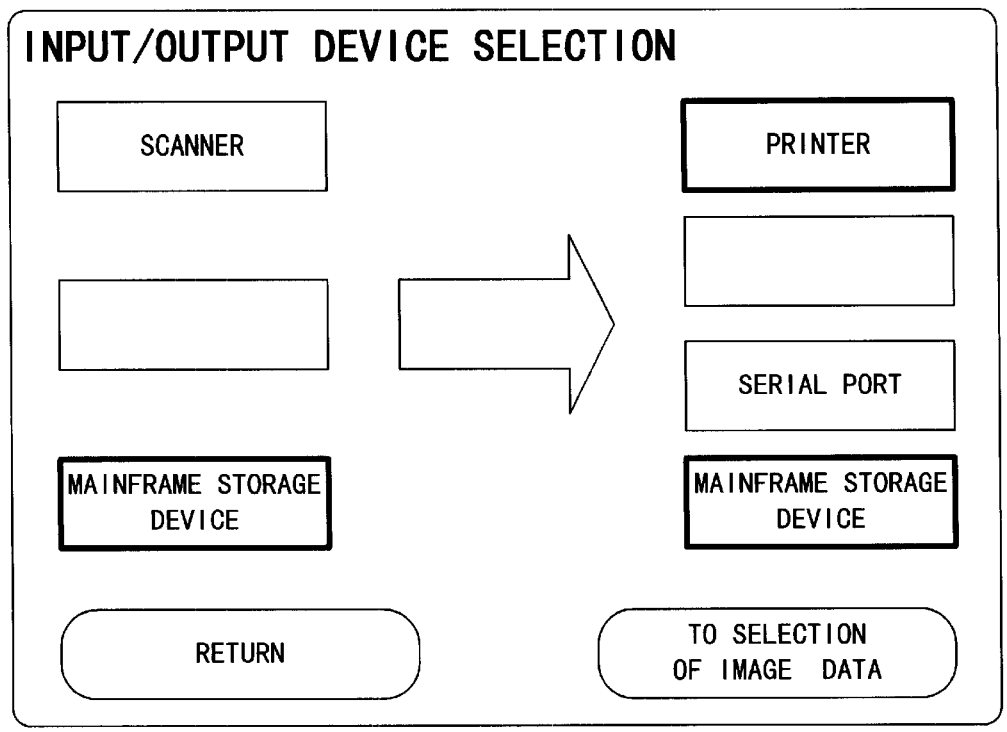
FIG. 7 shows another screen image, "INPUT/OUTPUT DEVICE SELECTION", wherein input device and output device are selected.

At the input device side (left side) in FIG. 6 "SCANNER" is displayed in reverse display and if the user fingers "MAINFRAME STORAGE DEVICE" in a position lower by two rows, the screen of FIG. 6 changes to the screen as shown in FIG. 7.

As described previously, since only one input device can be selected, "SCANNER" reversed so far is no longer in a selected (reversed) state.

Further, inside the frame in the lower right of the screen of FIG. 6 which remained blank, "TO SELECTION OF IMAGE DATA" is shown in the screen of FIG. 7.

Since in the mainframe storage device, namely the memory S in the present embodiment, image data of a plenty of jobs are stored, if the user selects "MAINFRAME STORAGE DEVICE", the user should specify which data to be outputted among these data.

The screen of "TO SELECTION OF IMAGE DATA" of FIG. 7 is for switching to a screen where the user can perform this specification. If the user fingers this "TO SELECTION OF IMAGE DATA", the screen of FIG. 7 switches to the screen of IMAGE DATA SELECTION of FIG. 8.

By the way, since in the state of FIG. 7, namely, in case that "MAINFRAME STORAGE DEVICE" is specified as the input device, the user must perform "SELECTION OF IMAGE DATA" without fail in principle, for this purpose the digital copier can be configured so as to urge the user to perform a shifting operation to the screen of IMAGE DATA SELECTION by, for example, blinking (flickering) the display item of "TO SELECTION OF IMAGE DATA" etc.

Figure 8:
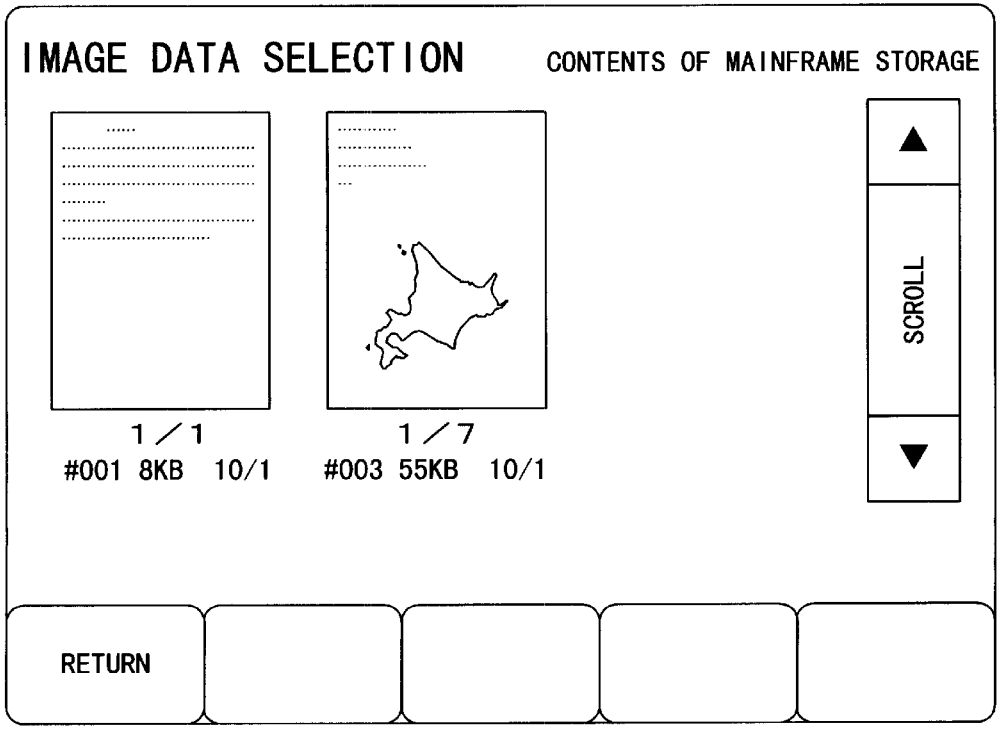
FIG. 8 shows another screen image, "IMAGE DATA SELECTION", wherein image data to be printed is selected.

In the upper right of the screen of FIG. 8 "CONTENTS OF MAINFRAME STORAGE DEVICE" is displayed, which shows what is displayed in this screen is the image data stored in the mainframe storage device.

In addition, this display is intended to discriminate the screen of FIG. 8 from an almost similar screen which is displayed when the memory card is inserted in the input side of the connector, as is described later.

In the center of the screen two rectangles are shown presently and this shows that two jobs are stored in the mainframe storage device. These rectangles themselves show outlines of the first pages of the jobs and are displayed as icons which are created from the stored image data by processing these and generating reduced rough images. The creation of the reduced rough image will be described later.

Under the reduced rough images, captions are displayed, for example "1/1", "#001", "8 KB", "10/1".

"1/1" means that this job comprises 1 page totally and the page shown by the icon is its 1st page.

"#001" means that the job of this icon is stored as #001.

"8 KB" means that the capacity of image data of the job is 8 KB.

"10/1" means that the date of storage of the job is October 1st.

In the middle right of the screen two triangles and "SCROLL" are displayed, which are for scrolling the screen when there are too many jobs to be shown in a single screen. If the user fingers the up-pointed or down-pointed triangle, the screen scrolls in the direction of the triangle, respectively.

If the user fingers "RETURN", the screen goes back to the screen of FIG. 7.

If the user wishes to output (print out), for example, job #003 from image data stored in the mainframe storage device, namely the memory S 119, the user is expected to finger an icon representing the job, in this case the icon showing Hokkaido in FIG. 8, so that image data to be outputted is selected.

Figure 9:
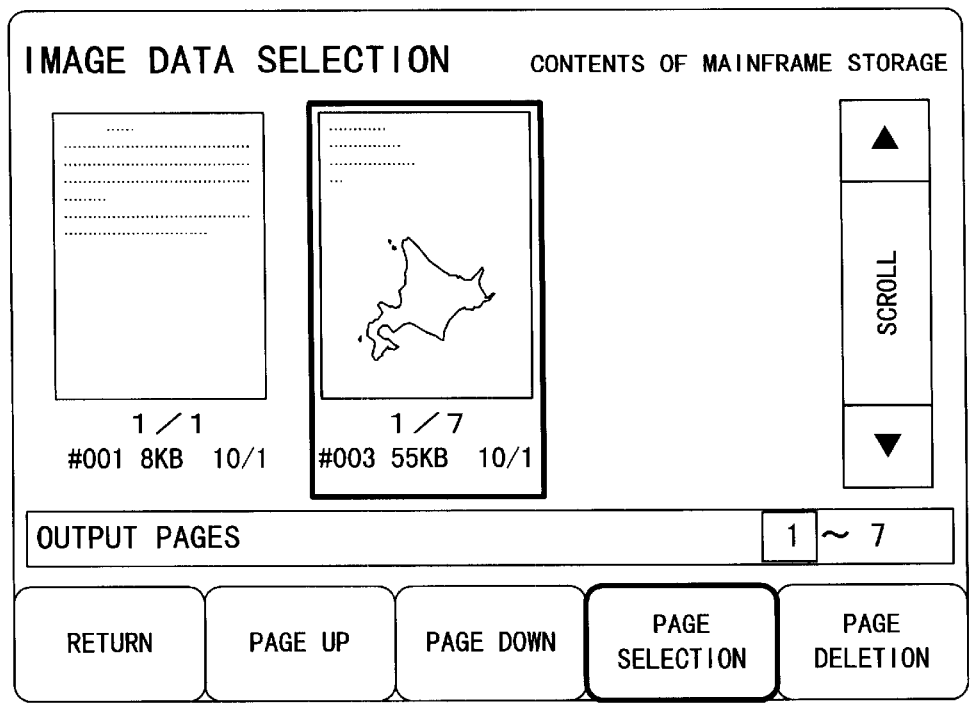
FIG. 9 shows another screen image, "IMAGE DATA SELECTION", wherein image data to be printed is selected.

For example, if the user fingers the icon of Hokkaido, the screen changes to such screen as is FIG. 9.

The icon of Hokkaido is displayed in a reverse display (in the figure, reverse display is represented by the encircled frame), the display item of "OUTPUT PAGES 1~7" is shown under the icon, and characters of "PAGE UP", "PAGE DOWN", "PAGE SELECTION", and "PAGE DELETION" emerge inside four frames in the lowest of the screen which were blanks until that moment.

Among the above-mentioned frames, the part of "PAGE SELECTION" is displayed in reverse display. This means the screen is in a state that the user can select an output page and shows that pages to be outputted are 1st to 7th page according to the display of "OUTPUT PAGES 1~7" mentioned above.

In the state of FIG. 9, the part of "1" in the display item of "OUTPUT PAGES 1~7" is displayed in reverse display, and this means the user can change the present value "1", which stands for output initiating page. In this state, if the user press, for example, key "3" in the ten-keys 1171, the part of "1" is changed to "3" and the output initiating page can be set to be the 3rd page. The numeric of this part is increased or decreased by the amount of unity by pressing "PAGE-UP" or "PAGE-DOWN", respectively, instead, so that the numeric can be also changed by this operation.

Figure 10:
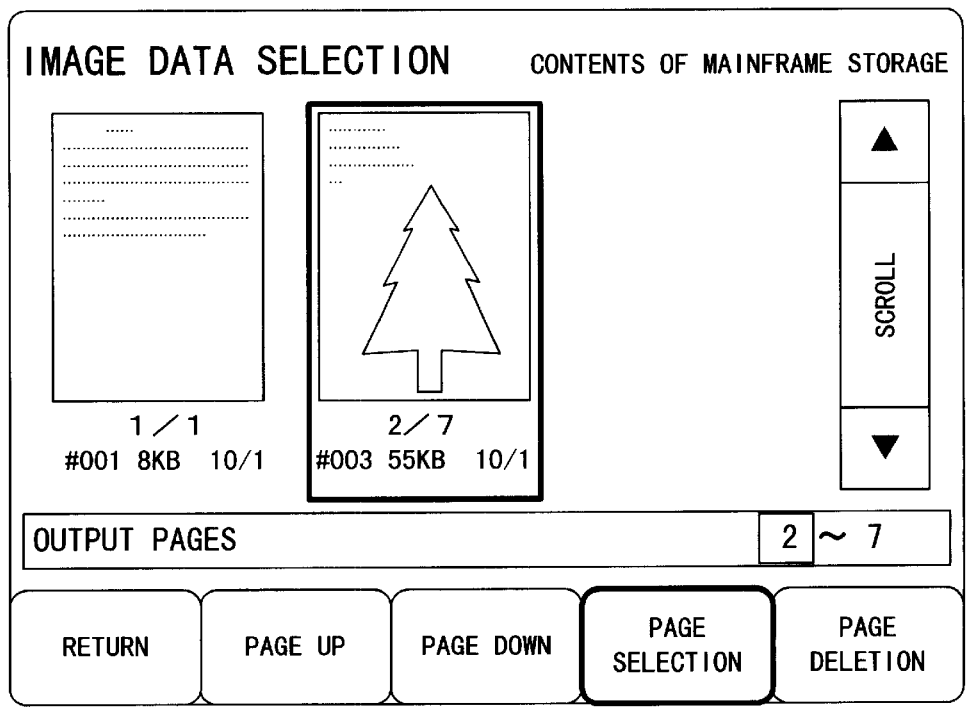
FIG. 10 shows another screen image, "IMAGE DATA SELECTION", wherein image data pages to be printed are selected.

FIG. 10 is the screen which is shown after setting the output initiating page to be 2. Since the output initiating page is set to be 2, the 2nd page of job #003 is transformed into an icon and displayed in the screen. As the 2nd page contains a picture of a tree, the icon changed to an icon of the picture of a tree.

Besides, it is naturally possible that even if the output initiating page is changed, an icon showing a representative page or the 1st page remains displayed as it did.

For setting a completing page, if the user fingers the part of "7" in "OUTPUT PAGES 1~7", this part changes into a reverse display, so that the user can specify the page in the same way as is for the output initiating page. In this case, it is possible that a specified page is displayed by an icon which is created by converting the page thereto and also possible that such processing is inhibited.

Figure 11:
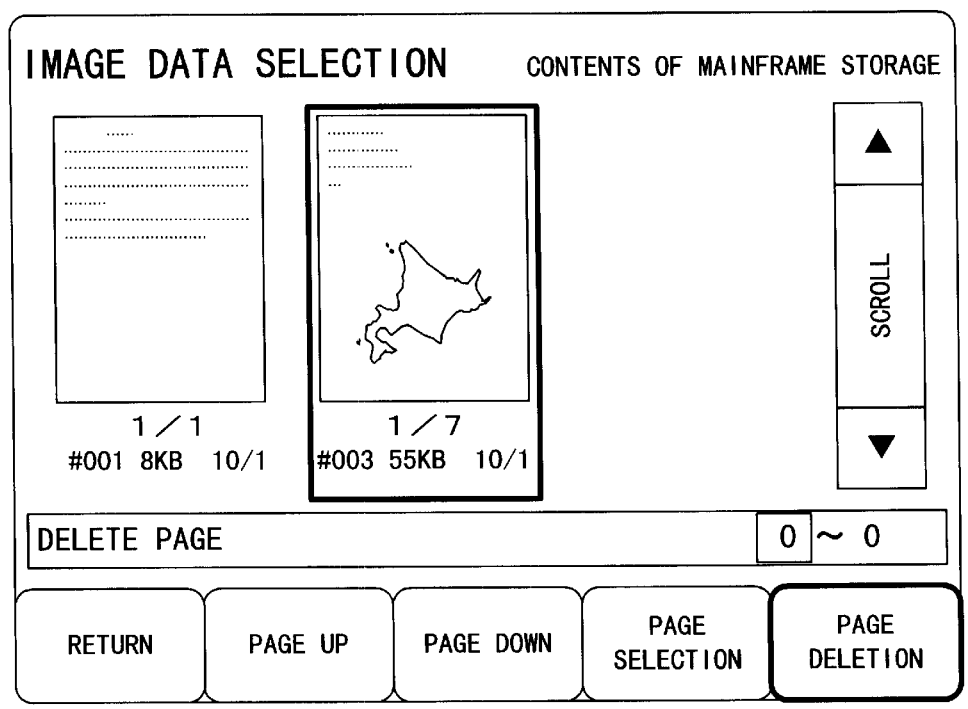
FIG. 11 shows another screen image, "IMAGE DATA SELECTION", wherein image data pages to be deleted are selected.

Specifying the output pages can be also performed by specifying pages which are not to be outputted. In its case, if the user fingers "PAGE DELETION", the screen changed to such screen as FIG. 11.

In this occasion, the part of "PAGE DELETION" is displayed in reverse display and the display item of "DELETE PAGE 0~0" is shown. In the previous case of specifying the output pages, default is set so as to output all the pages, while in case of deleting a page default is set so that no page is to be deleted at al.

Specifying the initiating page and the completing page of PAGE DELETION and the change of an icon are the same as is in case of PAGE SELECTION described previously.

In addition, in case that after the user specifies the output page in "PAGE SELECTION", the user specifies a page which was already set not to be outputted in "PAGE DELETION"; or in case that the situation above mentioned is in reverse order; or in case that specifications which are inconsistent with each other are set; it is possible to configure the digital copier so as to give the user a warning concerning such inconsistency or so as to give priority to either precedent specification or subsequent specification.

(2) If the memory card is inserted only in the input side of the card connector 118

If the memory card is inserted in the input side of the card connector 118 of the digital copier of the present embodiment, the insertion of the card is detected and a screen of "IMAGE DATA SELECTION" such as is FIG. 12 is displayed on the LCD 1178 with a fitted touch panel. This first shown screen is a screen of "IMAGE DATA SELECTION", which is contrary to the case described previously wherein the memory card in not inserted.

In this embodiment, a specification is set wherein, if the memory card is inserted in the input side of the card connector 118, the memory card is preferentially selected as the input device and the printer is selected as the output device.

Same as is the case of the mainframe storage device, since image data of a plenty of jobs are stored in the memory card, if the user selects "MEMORY CARD", the user should specify which job to be outputted among the image data.

In the upper right of the screen of FIG. 12, "CONTENTS OF MEMORY CARD" is displayed and this shows that what is shown in the screen is the image data stored in the memory card. Further, this display item is for discriminating the screen of FIG. 12 from an almost same display which is shown when the mainframe storage device is selected as the input device.

In the center of the screen two rectangles are shown presently and this shows that two jobs are stored in the memory card device. These rectangles themselves show outlines of the 1st pages (or representative pages) of the jobs. The rectangles are icons which are created from the stored image data by processing these and then generating reduced rough images. The creation of the reduced rough image will be described later.

Under the reduced rough images, captions are displayed, for example "1/7", "#003", "55 KB", "10/1".

"1/7" means that this job comprises 7 pages totally and the page shown by the icon is its 1st page.

"#003" means that the job of this icon is stored as #003. 55 KB" means that the capacity of image data of the job is 55 KB. "10/1" means that the date of storage of the job is October 1st.

In the middle right of the screen two triangles and "SCROLL" are displayed, which are for scrolling the screen when there are too many jobs to be shown in a single screen. If the user fingers the up-pointed or down-pointed triangle, the screen scrolls in the direction of the triangle, respectively.

Figure 13:
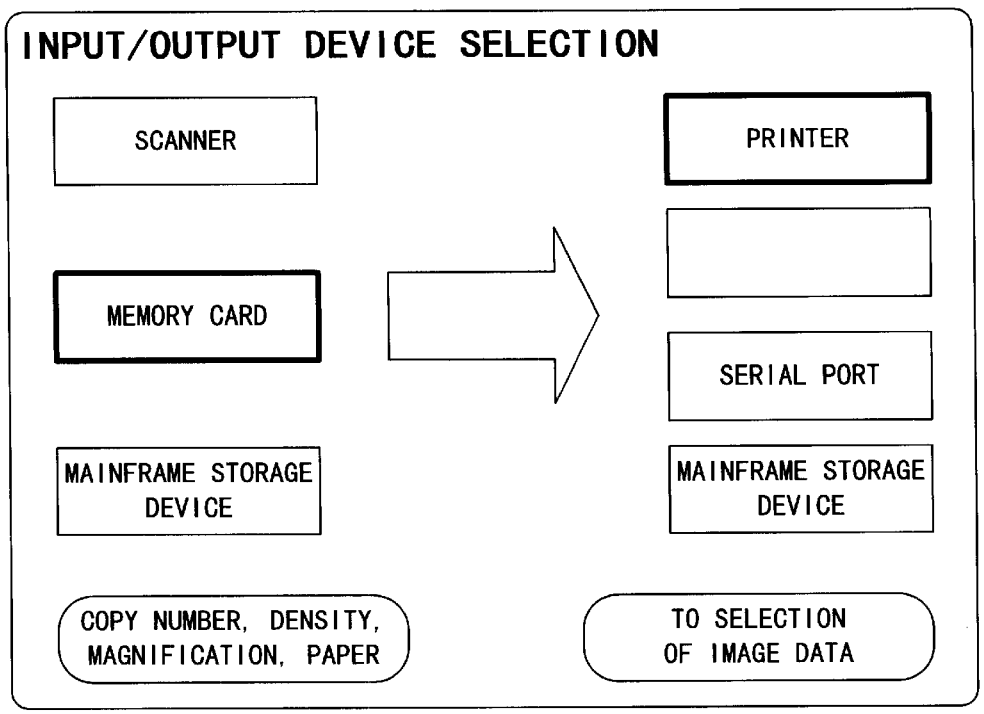
FIG. 13 shows another screen image, "INPUT/OUTPUT DEVICE SELECTION", wherein input device and output device are selected.

If the user fingers "RETURN", the screen goes back to the screen of FIG. 13.

Unlike the case that the memory card is not inserted, since, if the insertion of the memory card is detected, the screen shown first is the screen of IMAGE DATA SELECTION, the user is expected to finger this "INPUT/ OUTPUT DEVICE SELECTION" if the user wishes to select the input/output device from this screen of "IMAGE DATA SELECTION". Further, the situation of INPUT/ OUTPUT DEVICE SELECTION is such as is shown in FIG. 13 by default: an input device being the memory card, the output device being a printer, and the mainframe storage device being not selected. The reason why the mainframe storage device is not selected as the output device is in light of confidentiality, as is described previously.

Figure 14:
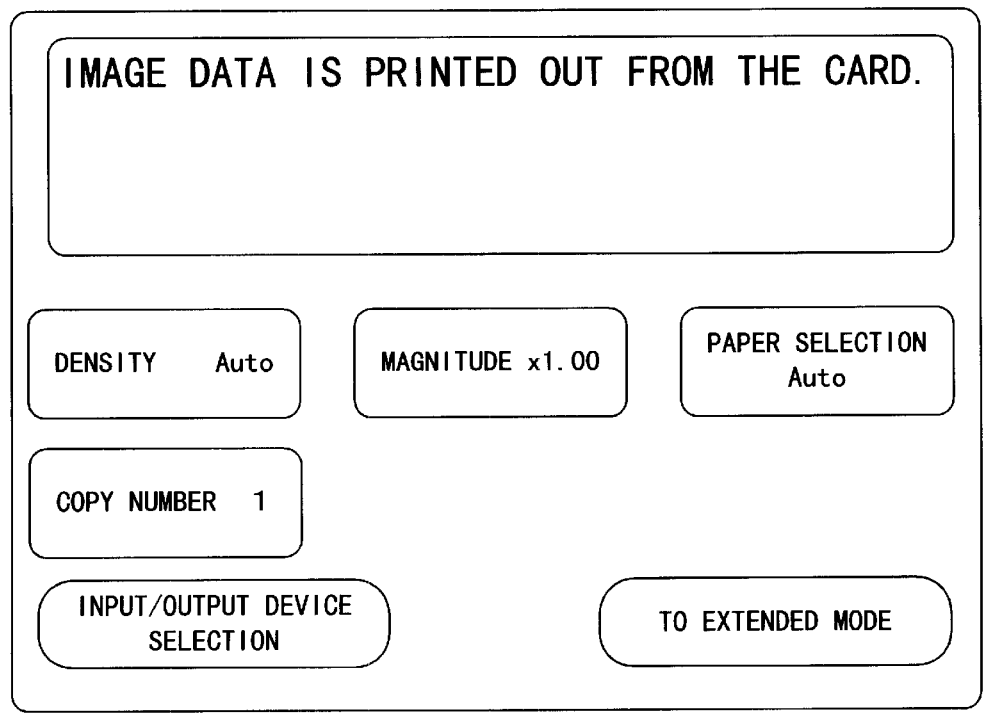
FIG. 14 shows another screen image, wherein copied image data is to be stored in inserted memory card.

In FIG. 13, since the printer is selected as the output device, a display item of "COPY NUMBER, DENSITY, MAGNIFICATION, PAPER" is shown. If the user fingers this part, a screen of FIG. 14 is shown.

Since the default is: COPY NUMBER, DENSITY, MAGNIFICATION, and PAPER are one sheet, automatic adjustment, unity, and automatic selection, respectively; if the user wishes to alter this, the user is expected to finger a part of "COPY NUMBER, DENSITY, MAGNIFICATION, PAPER", make the display device show the screen of FIG. 14, and make alteration in this screen. A procedure of the alteration is the same as is described at "(1) If the memory card is not inserted".

In FIG. 13, if the user fingers "TO SELECTION OF IMAGE DATA", the screen goes back to the screen of FIG. 12.

If the user wish to output (print out) image data of a job from image data stored in the memory card, for example that of job #003, the image data are selected by fingering an icon representing the job, namely the icon showing Hokkaido.

Figure 15:
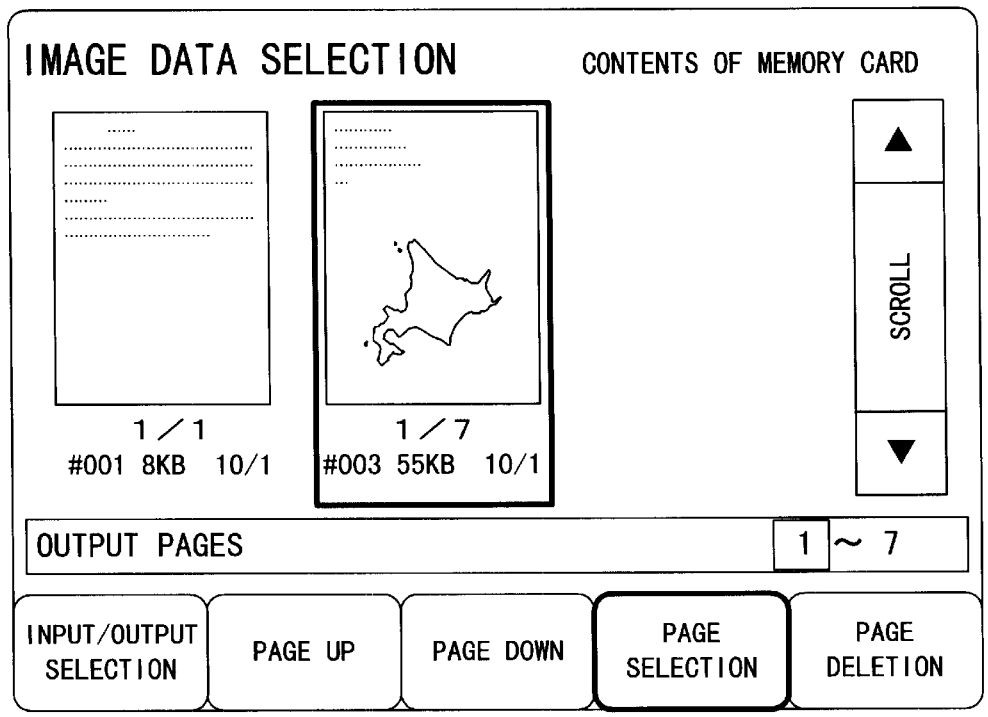
FIG. 15 shows another screen image, "IMAGE DATA SELECTION", wherein image data to be printed is selected.

For example, if the user fingers the icon of Hokkaido, the screen changes to the screen as is shown in FIG. 15.

The icon of Hokkaido is displayed in reverse display (in the figure, the reverse display is represented by the encircled frame), a display item of "OUTPUT PAGES 1~7" appears, and characters of "PAGE UP", "PAGE DOWN", "PAGE SELECTION", and "PAGE DELETION" emerge inside four frames located in the lowest of the screen which were blanks until that moment.

Among the above-mentioned frames, a part of "PAGE SELECTION" is displayed in reverse display. This means that the screen is in a state wherein the user can select an output page and shows that pages to be outputted are the 1st to the 7th pages according to the display item of "OUTPUT PAGES 1~7" mentioned above.

In the state of FIG. 15, a part of "1" of the display item of "OUTPUT PAGES 1~7" is displayed in reverse display, and this means that the user can change the present value "1", which stands for the output initiating page. In this state, for example, if the user presses KEY "3" in the ten-keys 1171, a part of "1" is changed to "3" and the output initiating page can be set to be the 3rd page. The numeric of this part is increased or decreased by the amount of unity by pressing "PAGE-UP" or "PAGE-DOWN", respectively, so that the numeric can be changed by this operation.

Figure 16:
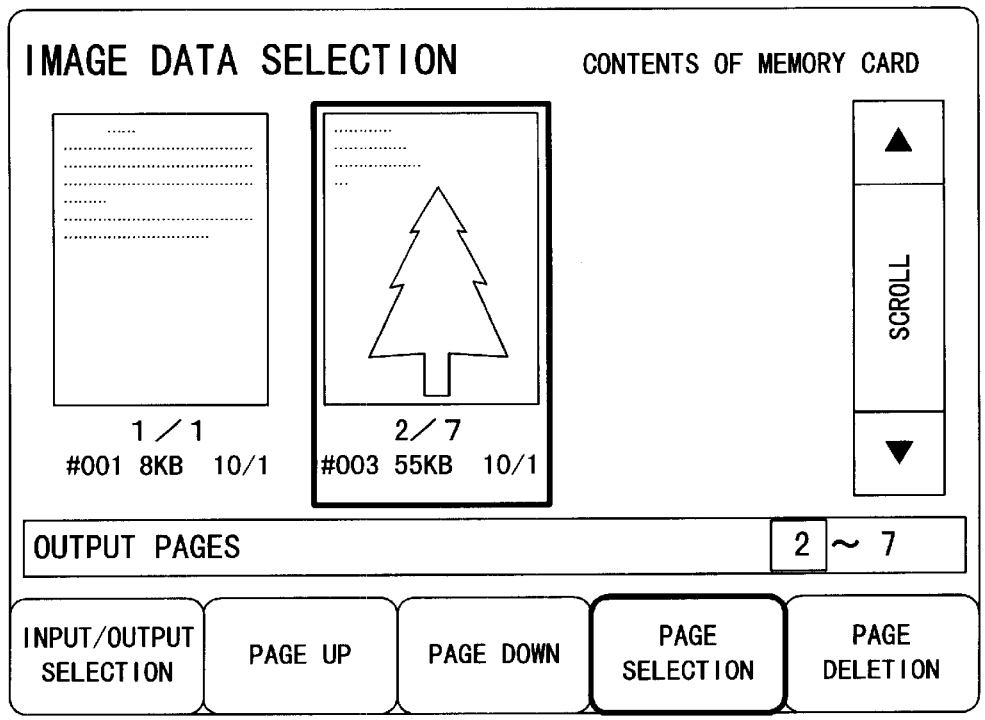
FIG. 16 shows another screen image, "IMAGE DATA SELECTION", wherein image data pages to be printed are selected.

FIG. 16 is a screen displayed just after setting the output initiating page to be 2. Since the output initiating page is set to be 2, the 2nd page of job #003 is transformed into an icon and displayed on the screen. As the 2nd page contains a picture of a tree, the icon changed to an icon of a picture of a tree.

Besides, it is naturally possible that, even when the output initiating page is changed, an icon representing a representative page or the 1st page remains displayed as it did.

For setting the completing page, if the user fingers a part of "7" in "OUTPUT PAGES 1~7", this part changes into reverse display, so that the user can specify a page as is performed for the output initiating page.

In this case, it is possible that a specified page is displayed by an icon which is created by transforming the page and also possible that such processing is inhibited.

Figure 17:
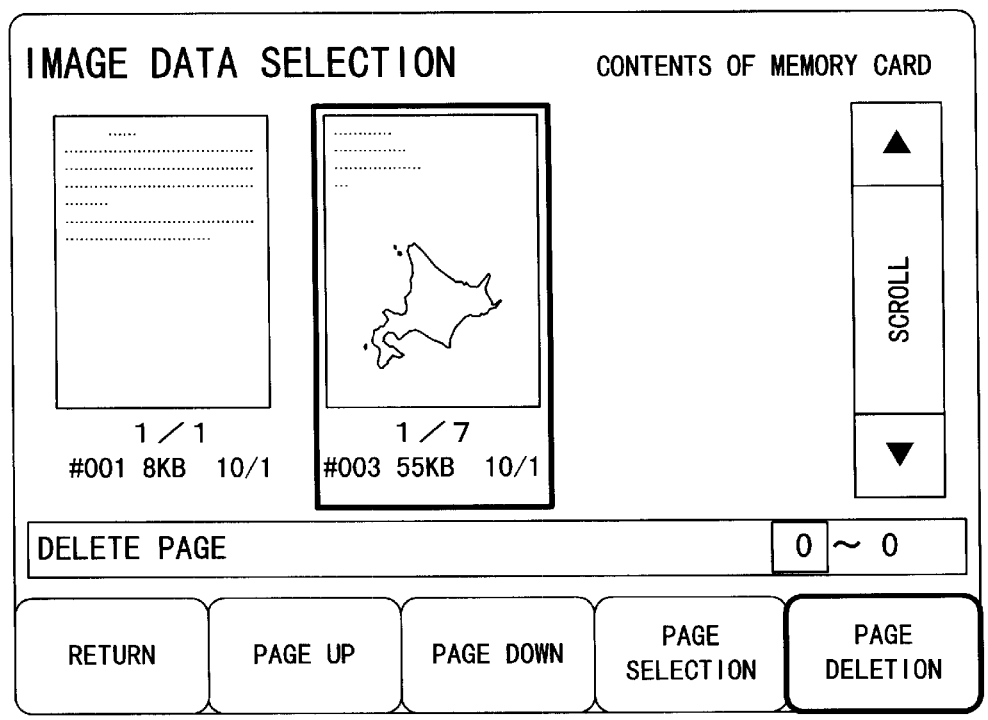
FIG. 17 shows another screen image, "IMAGE DATA SELECTION", wherein image data pages to be deleted are selected.

Specifying output pages can be also done through specifying pages which are not to be outputted. In its case, if the user fingers "PAGE DELETION", the screen changed to such as is shown in FIG. 17.

In this occasion, a part of "PAGE DELETION" is displayed in reverse display and a display item "DELETE PAGE 0~0" appears. In the previous case of specifying an output page, a default that all the pages are to be outputted is set, while in case of specifying a deleted page a default that no page is to be deleted is set.

Specifying the initiating page and the completing page of page deletion and the change of an icon are the same as in the case of page selection described previously.

In addition, in case that after the user specifies an output page in "PAGE SELECTION", in case that the user specifies a page which is not to be outputted in "PAGE DELETION", in case that the situation is in reverse order, and in case that specifications inconsistent with each other are specified; it is possible to configure the digital copier so as to give the user a warning concerning such inconsistency, or so as to give priority to either precedent specification or subsequent specification.

(3) In case that the memory card is inserted only into the output side of the card connector 118

If the memory card is inserted in the output side of the card connector 118 of the digital copier of the present embodiment, the insertion of the card is detected and a screen of "INPUT/OUTPUT SELECTION" as is shown in FIG. 18 is displayed on the LCD 1178 with a fitted touch panel.

As is understood from this screen, default at this occasion is that input device is the scanner and an output device is the memory card. Since the digital copier is configured so that, when the memory card is inserted, image data are no longer stored in the mainframe storage device, the mainframe storage device is not selected in this default.

Since in case that a input device is the scanner there can not be selection of image data, selection of image data as is in (1) and (2) is not necessary.

And, because the printer is selected as an output device, there is the selection of print density, the number of print, print magnification, and paper size. Accordingly, in default "COPY NUMBER, DENSITY, MAGNIFICATION, PAPER" appears and the display of "TO SELECTION OF IMAGE DATA" does not appear.

From this screen, the user can change a default setting to a setting: an input device is "mainframe storage device" and output devices are "serial port" and "mainframe storage device ".

Depending upon the attribute of an altered device, the user is requested to perform selection further.

For example, if an input device is changed from "scanner" to "mainframe storage device", "TO SELECTION OF IMAGE DATA", as shown in FIG. 7, appears inside a frame which was blank until that moment and "MAINFRAME STORAGE DEVICE" of the output device is inverted. By the way, the reason why "MAINFRAME STORAGE DEVICE" is inverted at that moment is that, since the data are stored in the mainframe storage device and so retains an opportunity of being seen by other people, there can be no necessity of deleting it from the mainframe storage device simply because the memory card is selected.

(4) in case that the memory cards are inserted in the input side and the output side of the card connector 118.

If the memory cards are inserted in the input side and the output side of the card connector 118, the insertion of cards is detected and "IMAGE DATA SELECTION", as is shown in FIG. 12, is displayed on the LCD 1178 with a fitted touch panel the same as is mentioned previously.

The operation of the image data selection is substantially the same as is the case of (1) and (2) described previously.

In the screen of FIG. 12, if the user fingers "INPUT/OUTPUT SELECTION", the screen of FIG. 19 is displayed.

Since the memory card is inserted in the input side and the output side of the card connector 118, default at this occasion is that the input device is the memory card and the output device is the printer. The mainframe storage device is not selected. From this screen the user can select all the input/output devices.

[Reprinting]

Here, especially in view of reprinting, the operation of storing image data when copying and the operation of printing image when reprinting by reading the image data from the memory are explained.

(1) in case that the memory card is not inserted in the output side

First, the operation of storing image data in concurrence with copying is explained.

The user is expected to set the density, magnification, the number of copies, and paper for printing a sheet of a manuscript from the operation panel, and select the scanner from the display of input devices and the printer and the mainframe storage device from the display of input/output devices (#302, FIG. 3A). If it is detected that items are selected (in case of YES, #410, FIG. 4B), the selected items are substituted in the parameter table (#411), whose values are reflected to a display in the step #408.

If the input/output devices are selected, a manuscript is specified as a read source and the printer and the memory S are specified as output devices through the step #414 which is a subroutine.

The user is expected to confirm contents of the display of input/output selection and presses the start key 1174 of the operation panel 117.

In the step #412, if the pressing is detected (in case of YES, #412), a sheet of manuscript being set in the scanner part 110 is read and image data being read are compressed and stored in the memory W (#305).

The image data stored in the memory W is processed according to the condition being set for reading and sent to the next the step (#310). Since the printer is set as the output device (in case of YES, #314), the image data are printed in the printer part 120 through the printer output routine. Since the memory S is set as an output device (in case of YES, #319), the image data being read is stored in the memory S (#320).

Next, the operation of reprinting is explained.

The user is expected to select MAINFRAME STORAGE DEVICE from the display of the input devices and PRINTER from the display of the output devices from the screen of INPUT/OUTPUT DEVICE SELECTION. If it is detected that items are selected (in case of YES, #410), the selected items are substituted in the parameter table (#411), whose values are reflected in the display.

If the input/output devices are selected, the memory S is set as the read source and the printer is set as the output device. The user is expected to select the screen of IMAGE DATA SELECTION from the screen of the LCD 1178 in the operation panel 117, make the display device show icons of the image data stored in the mainframe storage device (the memory S), and select image data which the user wishes to output. If it is judged that the image data are selected (in case of YES, #410), the icon of the selected image data are displayed in reverse display and the selection is confirmed (#411).

The user is expected to confirm contents of the display of INPUT/OUTPUT DEVICE SELECTION and press the start key 1174 in the operation panel 117.

In the step #412, if the pressing of the start key 1174 is detected (in case of YES, #412), the image data which are selected from the memory S and confirmed are read and the reprinting is performed.

Further, when the image data from the memory S are reprinted, the image data stored are selected and then reprinting is performed. However, as a different configuration of embodiment, default can be that image data which are stored most recently among image data being stored in the memory S are specified as an object to be outputted for reprinting.

(2) If the memory card is inserted in the output side

First, the operation of storing image data in the memory card in concurrence with copying is explained.

If the memory card is inserted in the output side insertion slot for the memory card, in case that it is judged that the memory card is not inserted in the input side insertion slot (in case of NO, #401) and the memory card is inserted in the output side insertion slot, default c is substituted in the parameter table (#406).

According to the default values substituted in the parameter table, SCANNER is indicated in the display of INPUT DEVICES, and PRINTER and MEMORY CARD are indicated in the display of OUTPUT DEVICES (#408). When the display according to the default values is performed, the manuscript is set as the input source and the printer and the card are set as the output devices (#452, #456, and #457 in the subroutine #414).

The user is expected to confirm contents of the display of INPUT/OUTPUT DEVICE SELECTION and press the start key 1174 in the operation panel 117. If the pressing of the start key 1174 is detected (in case of YES, #412), a sheet of manuscript being set on the scanner part 110 is read, and image data being read are compressed and stored in the memory W (#305).

The image data stored in the memory W are processed by the condition being set for reading and sent to the next step(#310). Since the card is set as the output device (in case of YES, #312), the image data which are read through the card output routine are stored in the card (#313). Since the printer is set as the output device(in case of YES, #314), the image data are printed at the printer part 120 through the printer output routine.

Next, the operation of reprinting of image data from the memory card is explained.

In the memory card inserted in the output side insertion slot for the memory card, image data which were stored through the above-mentioned operation are stored. To read and reprint the image data stored in this, the user is expected to unload the memory card from the output side insertion slot for the memory card and insert it in the input side insertion slot for the memory card.

If the memory card is inserted in the input side insertion slot, through the step #401 it is judged that there exists the memory card in the input side (in case of YES, #401) and no memory card in the output side (in case of NO, #403) and substitutes default into the parameter table (#405).

According to the default value substituted into the parameter table, it is shown that the display of INPUT DEVICES is CARD and the display of OUTPUT DEVICES is PRINTER. If the display according to the default value is performed, the card is set as the read source and the printer is set as the output device (the step #453, the step #456, and the step #459 in subroutine #414).

The user is expected to select the screen of IMAGE DATA SELECTION from the screen on the LCD 1178 in the operation panel 117, make the display device display icons representing image data stored in the memory card, and select image data which the user wishes to output. If it is judged that the selection of image data is performed (in case of YES, #410), an icon of the selected image data is displayed in reverse display and the selection is confirmed (#411).

The user is expected to confirm contents of the display of input/output selection and press the start key 1174 in the operation panel 117.

In the step #412, if the pressing of the start key 1174 is detected (in case of YES, #412), the image data which were selected from the memory card and confirmed are read and the reprinting is performed.

Further, when the image data from the memory card are reprinted, the stored image data are selected and reprinted. However, as other configuration of embodiment, it can be possible as default that image data which are stored most recently among image data stored in the memory card are set to be an object to be outputted for reprinting.

[Storing Format of Image Data]

In the present embodiment, image data are stored after being compressed. Since the degree of compression varies according to contents of the image data even using the same compression scheme, the image data after compression are variable-length data.

FIG. 20A to FIG. 20G shows the constitution of image data stored in the memory, wherein the image is controlled as a data block by each page.

The data block comprises a header and a dot data part, namely compressed image data.

The header comprises: an identification number, namely a job number term, a block size term showing a size of the block, a term showing an address where a data block of a page previous by one page is stored, and a term showing an address where a data block of a page subsequent by one page is stored.

The control part affixes a common identification number automatically on each page of a bunch of manuscripts.

It is probable that a bunch of image data are not arranged regularly in the memory, but each data are stored at an empty address, by one address for one page. Therefore, a pointer is used for indicating connection of pages in the present embodiment. That is to say, a header of a data block of a certain page contains an address wherein the page previous by one page is stored and an address wherein the page subsequent by one page, and thus data blocks of all the pages can be traced using these addresses as tags.

Since a bunch of manuscripts are stored in a compressed form one page by one page, if an icon is to be generated for a bunch of manuscripts, only a corresponding page is necessary to be uncompressed.

[Creation of icon]

If a screen is switched to the screen of image data selection, or if a situation happens wherein a new icon should be corresponded to a new page of a bunch of manuscripts because of page up etc., an: icon should be displayed in the screen.

Figure 21:
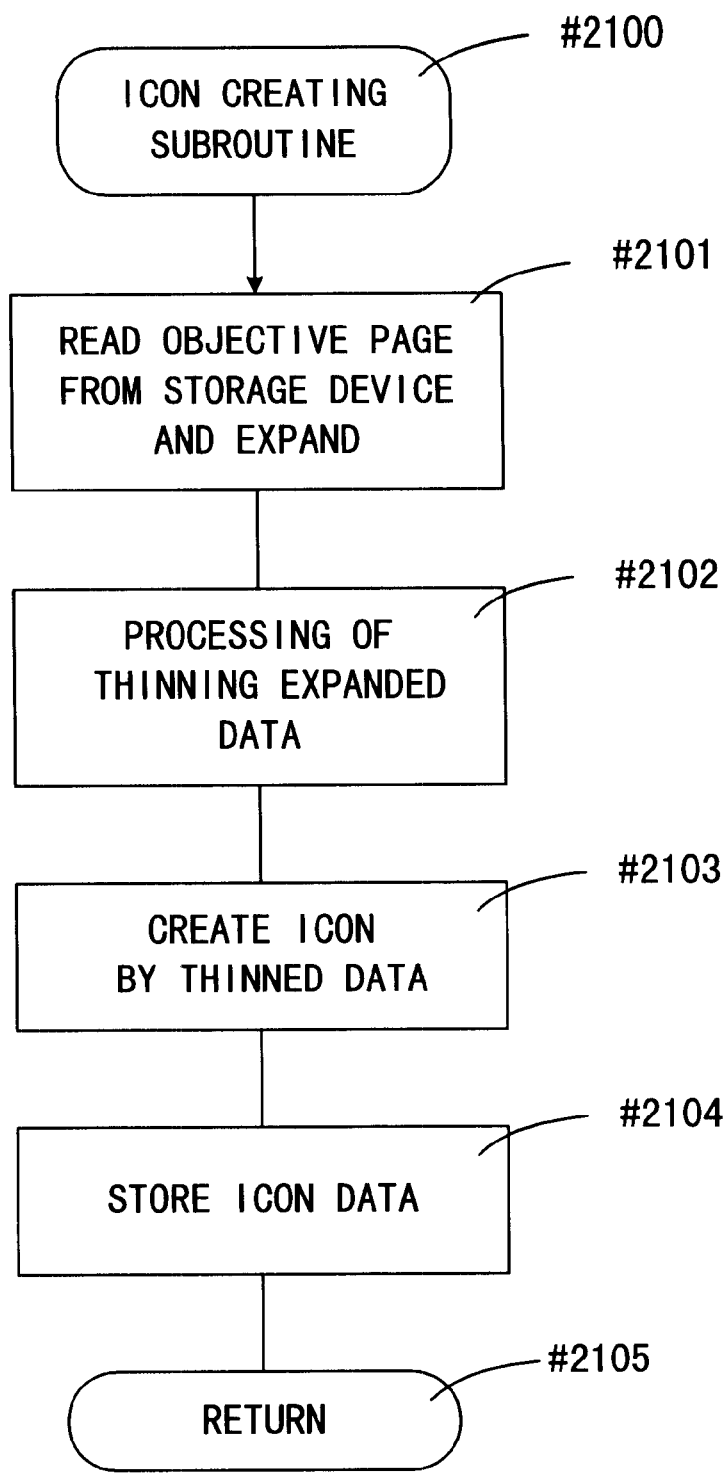
FIG. 21 shows a flowchart of "ICON CREATING SUB-ROUTINE".

It is possible that icon creation is performed at each occasion when an icon is to be displayed or that icons are created beforehand and stored, and, at each moment of display of a particular icon, the icon is called for. FIG. 21 shows icon creation subroutine for creating an icon.

If the flow enters the icon creating subroutine (#2100), the subroutine reads image data of an objective page from the memory and performs a process of expansion (#2101). In the step #2102, image data being read are processed so as to be thinned. In a process of data thinning, dot data are acquired from image data with a thinning ratio, 1 dot being obtained from every 80 dots both in the main scan direction and the sub scan direction. For example, image data of a A3 paper with 400 dpi is displayed with dimensions of 80×58 dots.

On the basis of the thinned data, an icon having an aspect of an objective page is created (#2103). The created icon is -stored along with the number of pages, a memory size, date, and data identification number of the image data (#2104), and the flow exits this subroutine (#2105). The stored icon data are called if necessary and displayed on the LCD 1178 with a fitted touch panel, for example, as shown in FIG. 8.

[Detection of the Insertion of the Memory Card]

Figure 22:
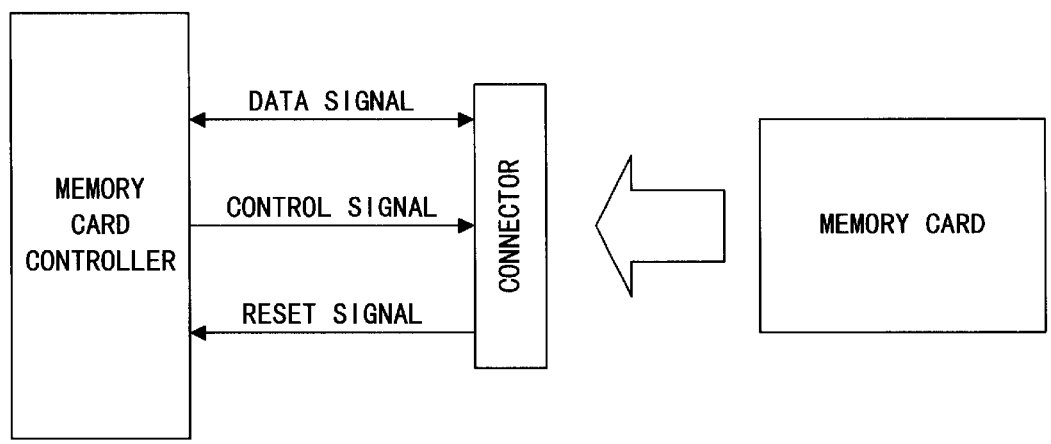
FIG. 22 is a diagram showing the memory card, the card connector in which the memory card is inserted, and flow of their signals.

FIG. 22 is a drawing illustrating a configuration for detecting the condition of insertion of the memory card.

If the memory card is inserted, a reset signal is generated to a memory card control part, an interruption signal is transmitted to the control part, and a flag representing the insertion of the memory card is set. By this process, writing in the memory card and reading from the memory card are made possible.

[Setting Subroutine]

The setting subroutine #414 of FIG. 4 which is shown in detail in FIG. 24 is explained.

SCANNER, MEMORY CARD, and MAINFRAME STORAGE DEVICE which are in the left of the arrow located in the center of the screen of INPUT/OUTPUT SELECTION shown in FIG. 6, FIG. 7, FIG. 13, FIG. 18, and FIG. 19 are the display of INPUT SOURCES and in the step $451 it is judged which of the INPUT SOURCES is selected (#451).

If the scanner is selected, the SCANNER is set as an INPUT SOURCE(#452). Similarly, if the MEMORY CARD is selected, the card is set as an INPUT SOURCE (#453), and if the MAINFRAME STORAGE DEVICE is selected, the memory S is set as an INPUT SOURCE (#454).

Next, PRINTER, MEMORY CARD, SERIAL PORT, MAINFRAME STORAGE DEVICE which are located in the right of the arrow located in the center of the screen of INPUT/OUTPUT SELECTION shown in FIG. 6, FIG. 7, FIG. 13, FIG. 18, and FIG. 19 are the display of OUTPUT DEVICES and it is judged which of the OUTPUT DEVICES is selected (#455). If the PRINTER is selected, the printer is set as the output device. If the MEMORY CARD is selected, the memory card is set as the output device (#457). If the SERIAL PORT is selected, the serial port is set as the output device (#458). If the MAINFRAME STORAGE DEVICE is selected, the memory S is set as the output device (#459).

The flow proceeds to the step #460. In the step #460, a various parameter such as for selection of image data, print density, the number of prints, print magnification, paper selection, etc. are specified.

According to defaults which are set on the parameter table in the step # 404 to the step # 407, the display of READ SOURCES and the display of OUTPUT DEVICES are performed on the LCD 1178.

With the default a, the display of READ SOURCES is SCANNER and the display of OUTPUT DEVICES is PRINTER and MAINFRAME STORAGE DEVICE.

With the default b, the display of READ SOURCES is MEMORY CARD and the display of OUTPUT DEVICES is PRINTER.

With the default c, the display of READ SOURCES is SCANNER and the display of OUTPUT DEVICES is PRINTER and MEMORY CARD.

With the default d, the display of READ SOURCES is MEMORY CARD and the display of OUTPUT DEVICES is PRINTER.

And according to contents displayed by each default value, a read source and a output device or output devices are set at the step #414.

With the default a, a manuscript is set as a input source and the printer and the memory S are set as output devices.

With the default b, the card is set as the input source and the printer is set as the output device.

With the default c, a manuscript is set as the input source and the printer and the card are set as the output devices.

With the default d, the card is set as the input source and the printer is set as the output device.

[Operation of the Printer Part]

Figure 23:
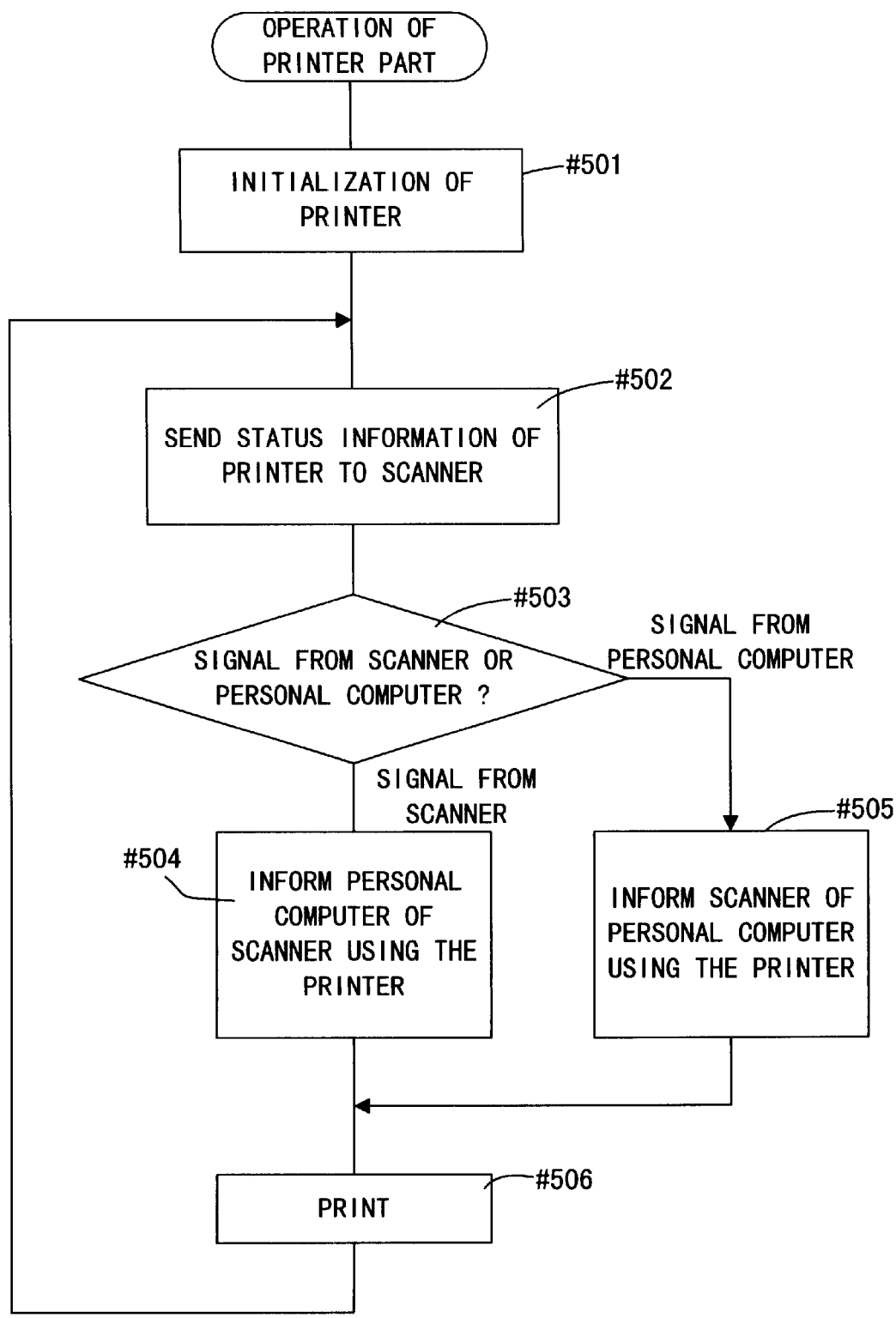
FIG. 23 is a flowchart showing operation of the printer part.

FIG. 23 shows a flowchart of the operation of the printer part.

If an electric power supply of the printer part is turned on, the initialization of the printer part is performed (#501). If the initialization of the printer part is completed, status information of the printer is a sent to the scanner part (#502). The printer part judges a printer usage requiring signal and whether image data are received from the scanner or the personal computer (#503). If the printer part receives a signal from the scanner, the printer part informs the personal computer that the scanner is using the printer (#504). If the printer part receives a signal from the personal computer, the printer part informs the scanner that the personal computer is using the printer(#505). If the preparation of the printing is completed, the received image data are printed out (#506).

[Reprint Command from the Personal Computer]

A dedicated utility software is necessary for the personal computer in addition to a printer driver for the printer connected. This utility software can specify the reprinting and execute it.

If the user specifies the reprinting by the personal computer, the utility software requires necessary information for reprinting to the digital copier and receives this from the digital copier. Information to be received are reduced image data (icon data) which representing image data stored inside the digital copier.

In the digital copier, icons representing image data for reprinting are displayed on its operation panel and the displayed icons are correlated with addresses for the image data corresponding to the icons by a control table. The control table exists in order to correlate icon to image data address of the memory. The utility software of the personal computer displays the image data using an reduced image (icon) on the screen and a user is selects image data which he wish to reprint by selecting an icon. If receives the selection information, the digital copier specifies the address of the image data by referring the control table. The digital copier reads image data at the address of the memory and executes printing in accordance with the set condition.

The Second Embodiment

In the above-mentioned first embodiment, the card connector for memory card comprises input side and output side. In the second embodiment, a card connector comprises a single side which can be used for input or output. As only one card is available simultaneously or only one card can be inserted into the connector simultaneously, default is set to be that the connector for memory card is assigned for output at first. therefore, in this embodiment, if the memory card is inserted in a card connector, the output devices displayed on the LCD 1178 are set to be the printer and the memory card, while, if the memory card is not inserted in the card connector, the output device displayed on the LCD 1178 are set to be the printer and the mainframe storage device.

Figure 25:
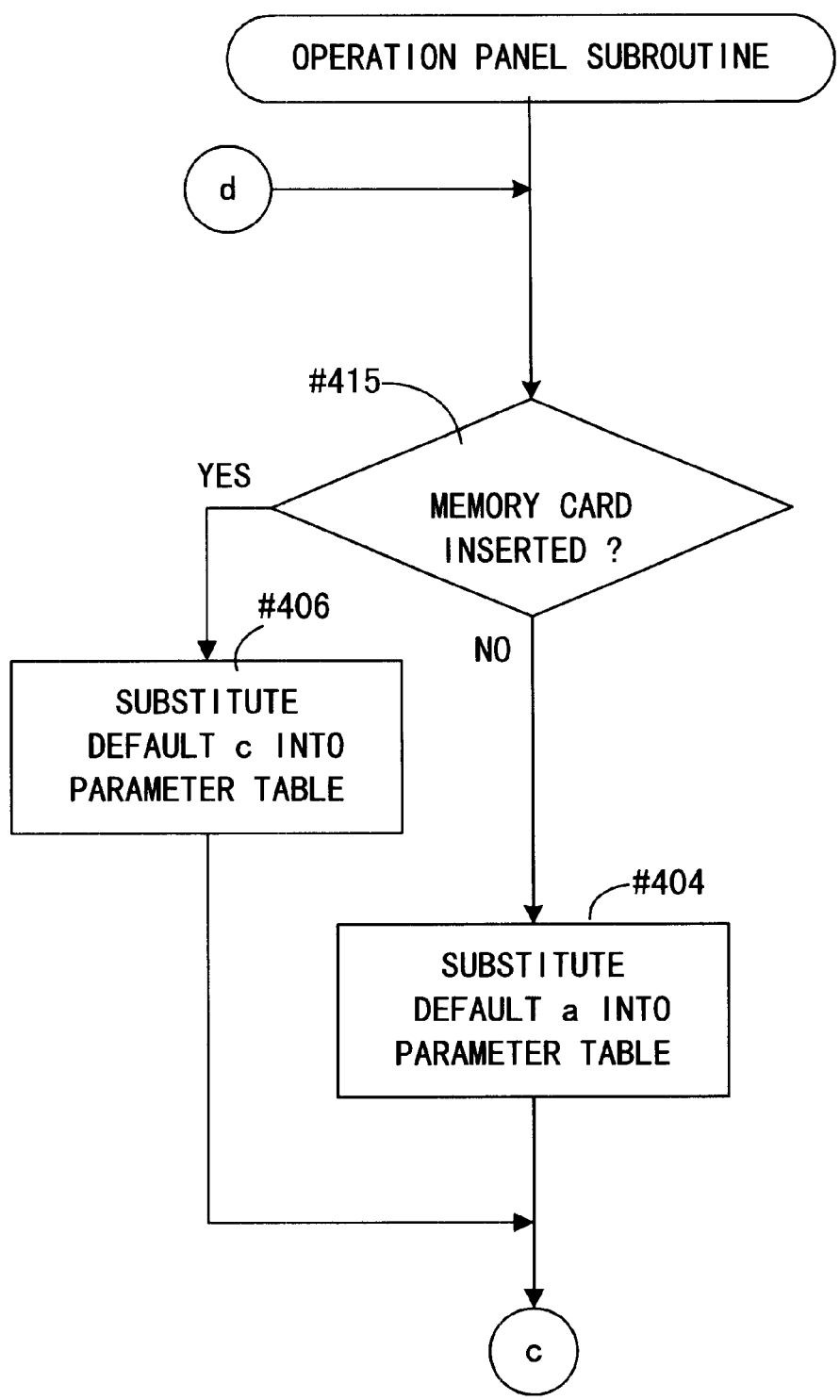
FIG. 25 shows a part of flowchart of "OPERATION PANEL SUBROUTINE" in the second embodiment.

FIG. 25 shows a part of flowchart of the operation panel subroutine which is substituted for FIG. 4A of the first embodiment. In FIG. 25, the step #401, the step #403, the step #405, and the step #407 of FIG. 4A are removed, and the step #402 of FIG. 4A is altered to be the step #415 which detects insertion of memory card.

The default values which are to be substituted in the parameter table are a and c. The insertion of memory card is judged (#415), and if no card is inserted, default a is substituted, and if a card is inserted, default c is substituted.

With the default a, a document is set as a input source and the printer and the mainframe storage device are set as output devices. With the default c, a document is set as a input source and the printer and the memory card are set as output devices.

(1) In case that the memory card is not inserted. If a memory card is not inserted, a screen of FIG. 26 is displayed first and copied image data are stored in the mainframe storage device.

Figure 26:
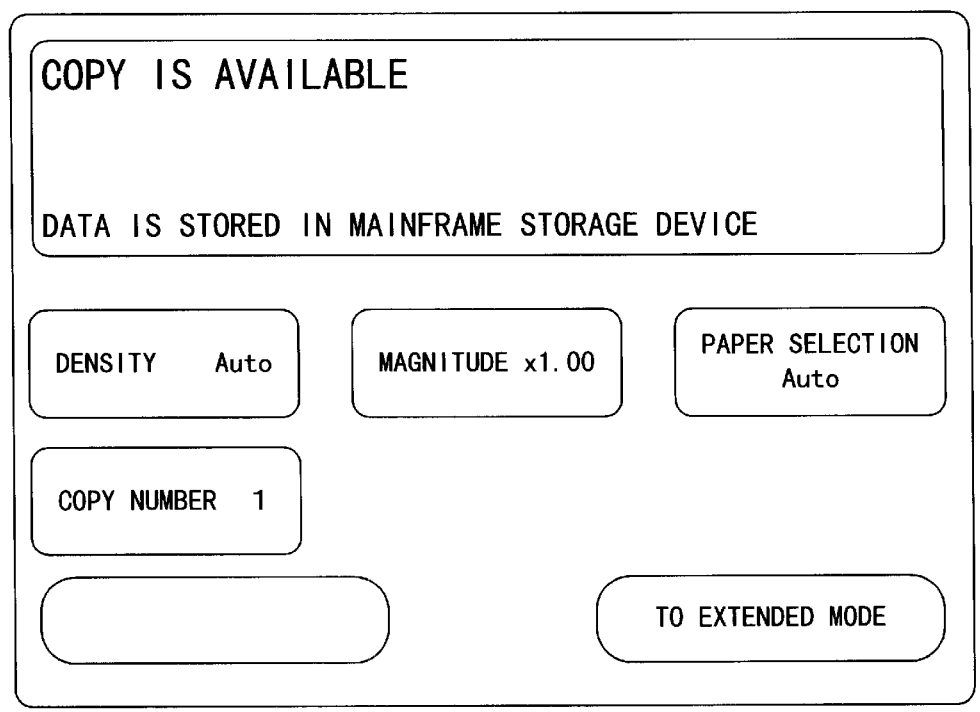
FIG. 26 shows an example of the first screen image on LCD of the operation panel displayed when memory card is not inserted in the second embodiment.

On the screen of FIG. 26, if the user touches "TO EXTENDED MODE", the same screen as FIG. 6 is displayed. The pictures displayed on the screen in the second embodiment are the same as the pictures shown in FIG. 11 for the first embodiment, therefore the explanations are omitted.

(2) In case that the memory card is inserted.

Figure 27:
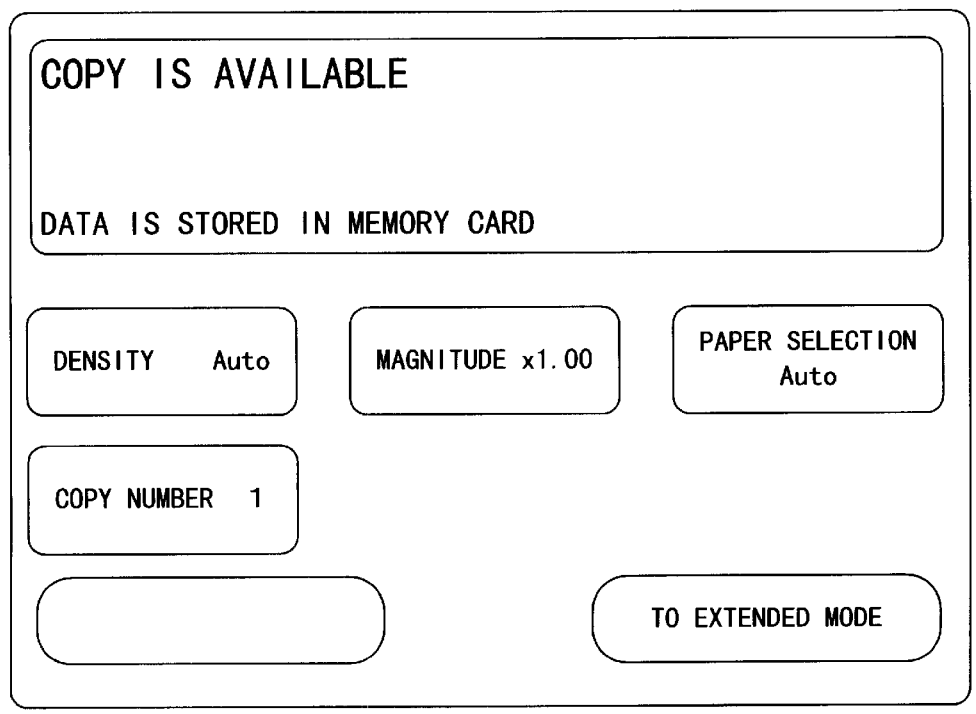
FIG. 27 shows an example of the first screen image on LCD of the operation panel displayed when memory card is inserted in the second embodiment.

If the memory card is inserted, a screen of FIG. 27 is displayed first and the copied image data are stored in the memory card.

Figure 28:
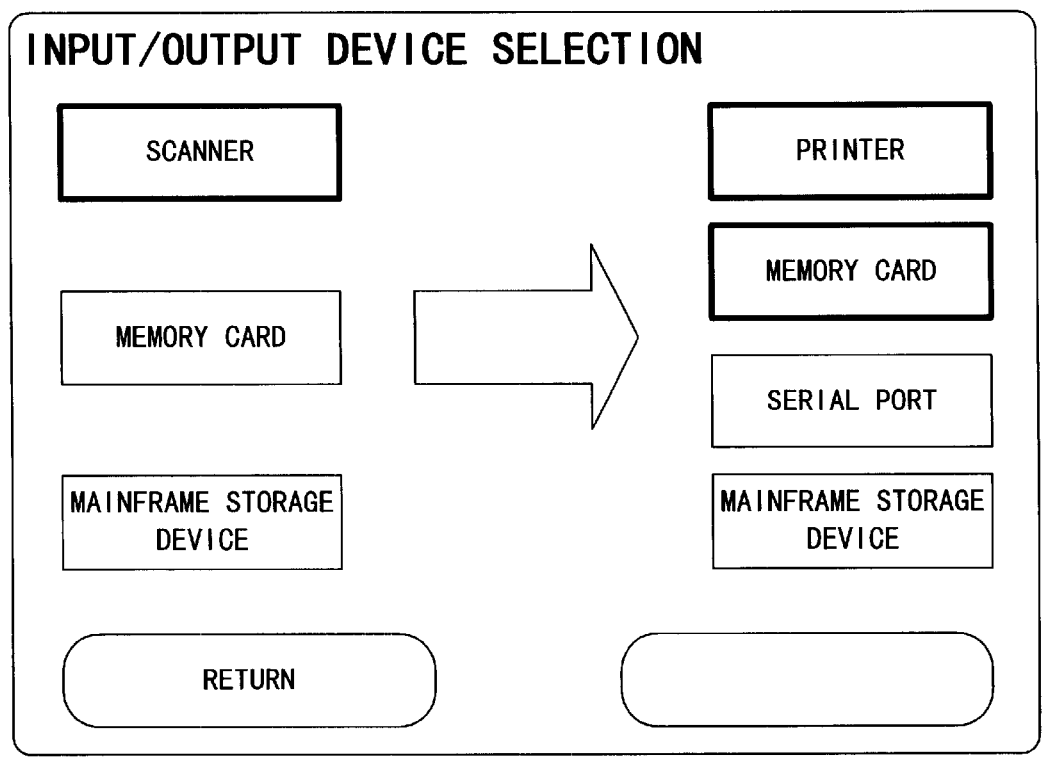
FIG. 28 shows a screen image, "INPUT/OUTPUT DEVICE SELECTION", wherein input device and output device are selected in the second embodiment.

On the screen of this FIG. 27, if the user touches "TO EXTENDED MODE", a screen of FIG. 28 is displayed first, In this screen, a scanner is assigned as the input device, and a printer and a memory card are assigned as the output devices.

On the screen of dig. 28, the input device and the output device can be selected. If the user wishes to print image data stored in a memory card, the user is expected to touch the part of "MEMORY CARD" in the left of the arrow as an input device, then the screen changes to the screen as shown in FIG. 19. Since the memory card is intended to store data which should not open to others, when a screen is changed to this screen, the state that the memory card is selected for the output device is canceled and only the printer is set for the output device.

On the screen of FIG. 19, if the user touches the part of "TO SELECTION OF IMAGE DATA", the screen changes to the screen of IMAGE DATA SELECTION shown in FIG. 12. In this screen of IMAGE DATA SELECTION, image data are displayed as an icon and here the user is expected to select image data to be outputted. The pictures on the screen in the second embodiment are the same as the pictures shown in FIG. 12 to FIG. 17. Therefore, detailed explanations are omitted.

In the second embodiment, if the memory card is inserted, an initial condition is set so that the image data obtained through a copying job are to be stored in the memory card. To print contents of the memory card, the user is expected to set the memory card as the input device.

The Third Embodiment

Figure 29:
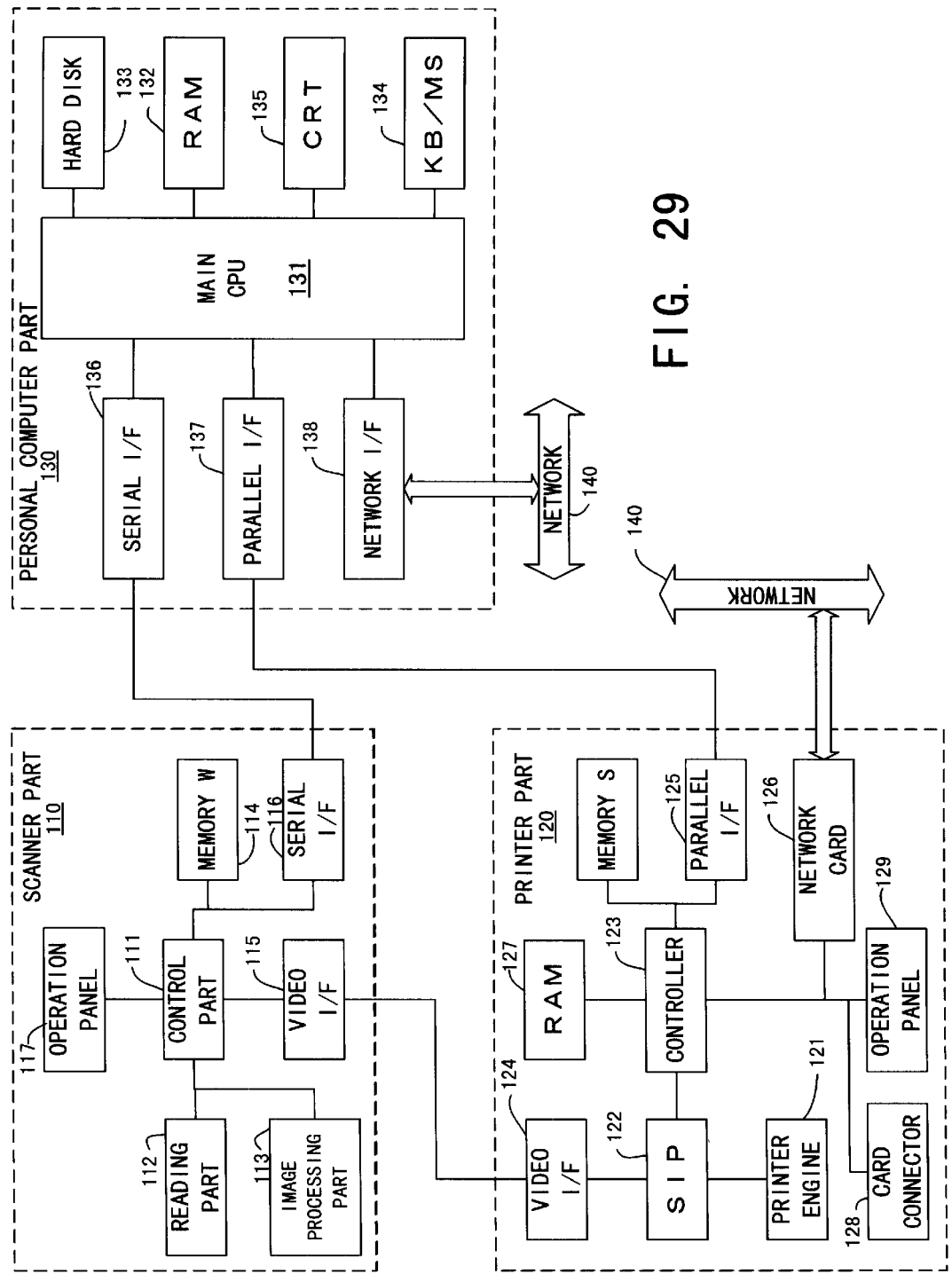
FIG. 29 shows a block diagram of a digital copier for third embodiment of the present invention, wherein image data is stored in the printer part.

FIG. 29 shows the block diagram of the third embodiment. The third embodiment differs form the first embodiment and the second embodiment on the point that the printer part 120 is equipped with the connector for the memory card, the memory card S for storing image data and an additional operation panel 129. The scanner part is equipped with neither card connector nor memory for storing image data.

In the third embodiment, most of control operations which are performed at the control part 111 in the first and second embodiments are performed with a controller 123.

Selection of image data, selection of input/output devices, etc. are performed with the operation panel 129 and the control of these devices are performed with the controller 123 instead of the control part 111.

The Fourth Embodiment

Figure 30:
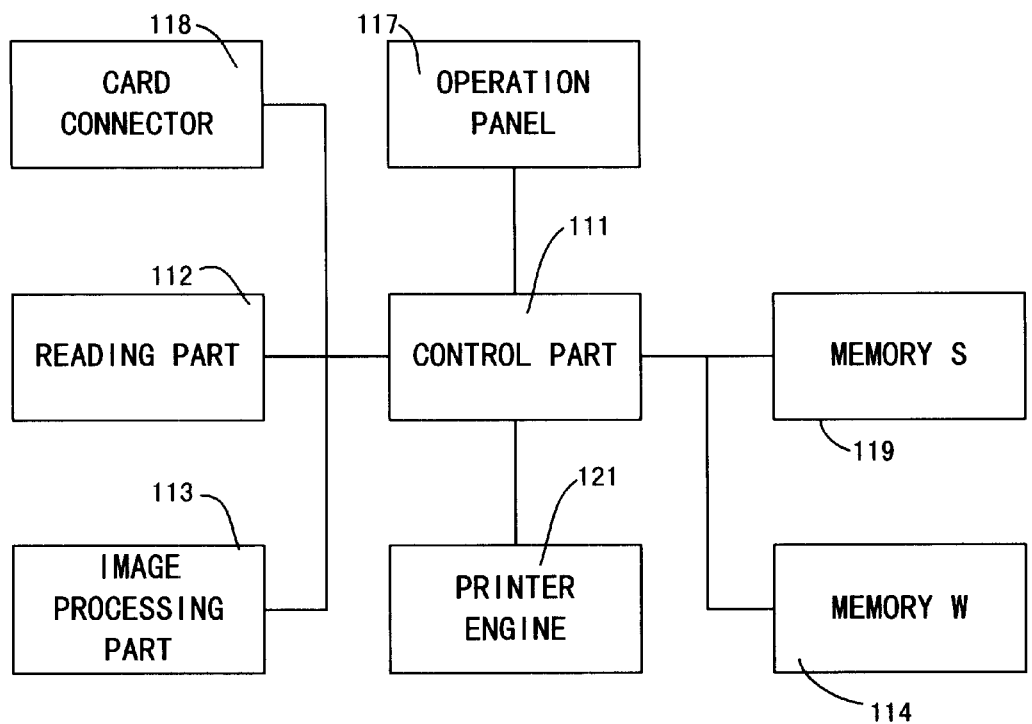
FIG. 30 shows a block diagram of a digital copier for fourth embodiment of the present invention, wherein single controller controls scanner part and printer part.

The FIG. 30 shows an example of a digital copier which takes a configuration of so-called integral type. The digital copier of fourth embodiment differs from embodiments on a point that a :scanner part and a printer part are housed in the same housing.

Therefore, the fourth embodiment does not include an interface connecting between the scanner part and the printer part which is necessary for the first to the third embodiments.

In this example, all the following controls are performed in the control part 111: detection control of the insertion of the memory card into the card connector 118, control of the writing of data in the memory card, control of the reading of data from the memory card, control of reading in the scanner (reading part 112), control of the operation panel, control of the writing and reading of the memory S 119 and the memory W 114, control of a printer engine 121, etc.

In the fourth embodiment, the controller 111 takes charge of all the controls and the load on the controller 111 becomes heavier, but there is a merit that the configuration of the digital copier is comparatively simplified.

What is claimed is:

1. A digital copying apparatus, comprising:
   an image reader which reads a document and outputs image data thereof;
   a first storage device for storing the image data outputted by said image reader;
   a printer engine for printing an image using the image data;
   a connector into which a second storage device is to be inserted, the second storage device configured for storing image data;
   a detector for detecting insertion of said second storage device into said connector; and
   a controller;
   wherein,
   when said second storage device is inserted into said connector, the image data outputted by said image reader is controlled by said controller to be stored in said second storage device without being stored in said first storage device.

2. A digital copying apparatus according to claim 1, further comprising;
   an inputting connector to which said second storage means is connected, for printing by said printing means using image data stored in said second storage means.

3. A digital copying apparatus according to claim 1, further comprising;
   an outputting connector to which said second storage means is connected, for storing image data outputted by said image reader in said second storage means.

4. A digital copying apparatus according to claim 1, further comprising;
   a displaying means; and
   a data processing means creating reduced image data by thinning image data stored in said second storage means.

5. A digital copying apparatus according to claim 1, wherein the image data outputted by said image reader is controlled by said controller to be stored in said first storage device and thereafter said printer engine is controlled by said controller to print using the image data stored in said first storage device when said second storage device is not inserted into said connector.

6. A digital copying apparatus comprising:
   an image reader for reading an image of an original document to obtain image data;
   a first storage device for storing the image data obtained by said image reader;
   a connector into which a second storage device is inserted, said second storage device storing the image data therein;
   printer engine for printing an image based on the image data stored in the first or second storage device;
   a display;
   an image processor for creating a-reduced image by thinning the image data stored in said second storage device; and
   a controller for determining whether or not said second storage device is inserted into the connector and for displaying the reduced image created by said image processor on the display when it is determined that said second storage device is inserted into the connector.

7. A digital copying apparatus according to claim 6, further comprising a selector for selecting the reduced image displayed on said display according to a user's instruction, wherein said controller controls said printer engine to print an image based on the image data corresponding to the reduced image selected by said selector.

8. An image data processing method for use with a digital copying apparatus including an image reader for reading an image of an original document to obtain image data, a first storage device for storing the image data obtained by said image reader, a connector into which a second storage device is inserted for storing the image data obtained by said image reader therein, a printer engine for printing an image based on the image data stored in the first or second storage device, a display, and an image processor for creating an reduced image by thinning the image data stored in said second storage device, said image data processing method comprising the steps of:
   determining whether or not said second storage device is inserted into the connector; and
   displaying the reduced image created by said image processor on said display when it is determined that said second storage device is inserted into the connector.

9. An image data processing method according to claim 8, further comprising the steps of:
   selecting said reduced image displayed on said display according to a user's instruction; and
   printing an image based on image data corresponding to said reduced image selected at the preceding step by the printer engine.

10. A digital copying apparatus comprising:
    an image reader for reading an image of an original document to obtain image data;

a storage device for storing the image data obtained by said image reader;

a connector into which a removable memory device is inserted, said removable memory device storing the image data therein;

a printer device for printing an image based on the image data stored in the storage device or the removable memory device;

a display;

an image processor for creating a reduced image based on the image data stored in the storage device or the removable memory device; and a controller for displaying a first screen and a second screen on the display, said first screen displaying a pointing area for calling said second screen, and said second screen displaying the reduced image for user's selection of an image to be printed.

11. A digital copying apparatus according to claim 10, wherein said controller determines whether or not said removable memory device is inserted into said connector, and displays said second screen without displaying said first screen when it is determined that said removable memory device is inserted into said connector.

12. An image reading apparatus, comprising:

an image reader for reading an image of an original document to obtain image data;

a first storage device for storing the image data obtained by the image reader;

a connector into which a second storage device is to be inserted, the second storage device configured for storing image data;

a detector for detecting insertion of the second storage device into the connector; and a controller for controlling such that the image data obtained by the image reader is stored in the second storage device without being stored in the first storage device when it is detected by the detector that the second storage device is inserted into the connector.

13. An image reading apparatus according to claim 12, wherein the controller controls such that the image data obtained by the image reader is to be stored in the first storage device when it is not detected by the detector that the second storage device is inserted into the connector.

14. An image data controlling method for use with an image reading apparatus which comprises an image reader for reading an image of an original document to obtain image data and a connector into which a removable storage device is to be inserted for storing image data, said image data controlling method comprising the steps of:

detecting whether or not the removable storage device is inserted into the connector; and storing the image data obtained by the image reader in the removable storage device without being stored in any storage device other than the removable storage device when it is detected at the detecting step that the removable storage device is inserted into the connector.

15. An image data controlling method according to claim 14, further comprising the step of storing the image data obtained by the image reader in a storage device other than the removable storage device when it is not detected at the detecting step that the removable storage device is inserted into the connector.

* * * * *

UNITED STATES PATENT AND TRADEMARK OFFICE
CERTIFICATE OF CORRECTION

PATENT NO.    : 6,498,658 B1
DATED         : December 24, 2002
INVENTOR(S)   : Katsuo Sekikawa It is certified that error appears in the above-identified patent and that said Letters Patent is hereby corrected as shown below:

Column 22,
Line 22, before "printer engine", add -- a --;
Line 25, change "a-reduced" to -- a reduced --;
Line 47, change "creating an reduced" to -- creating a reduced --.

Signed and Sealed this

Twelfth Day of August, 2003

JAMES E. ROGAN
*Director of the United States Patent and Trademark Office*